(12) United States Patent
Partridge et al.

(10) Patent No.: US 8,950,055 B2
(45) Date of Patent: Feb. 10, 2015

(54) NON-PENETRATING ANCHOR SYSTEM AND METHOD

(71) Applicants: Kirk Partridge, Park City, UT (US);
Todd Vought, Park City, UT (US);
Travis Vought, Salt Lake City, UT (US)

(72) Inventors: Kirk Partridge, Park City, UT (US);
Todd Vought, Park City, UT (US);
Travis Vought, Salt Lake City, UT (US)

( * ) Notice: Subject to any disclaimer, the term of this patent is extended or adjusted under 35 U.S.C. 154(b) by 0 days.

(21) Appl. No.: 13/676,292

(22) Filed: Nov. 14, 2012

(65) Prior Publication Data
US 2014/0130332 A1    May 15, 2014

(51) Int. Cl.
*B23P 11/00*    (2006.01)
*H02G 13/00*    (2006.01)

(52) U.S. Cl.
CPC ..................................... *H02G 13/00* (2013.01)
USPC ...................................................... 29/525.13

(58) Field of Classification Search
USPC ............ 29/525.01, 449, 428, 525.13; 156/71;
248/74.1, 553, 188
See application file for complete search history.

(56) References Cited

U.S. PATENT DOCUMENTS 5,050,836 A * 9/1991 Makous .......................... 248/553
2011/0286785 A1* 11/2011 Brouwer et al. ............... 403/188

* cited by examiner

*Primary Examiner* — John C Hong
(74) *Attorney, Agent, or Firm* — Pate Baird, PLLC

(57) ABSTRACT

An anchor for lightning protection systems include a base and pad that extend over a sufficient area and a sufficient bearing length to hold in shear and in tension against the weight, shear force, and moment of cables, points, and other components of a lightning protection systems. The mounting anchor is non-penetrating, and adheres to a vertical surface almost immediately without requiring damage to structures, long term support over days waiting for cure, and works in overhang situations as well. An integrated clip may be constructed with the base from sheet material. Adhesion of the base to a cover material on a wall or parapet may be promptly followed by snapping cable into clips formed monolithically with the base.

18 Claims, 19 Drawing Sheets

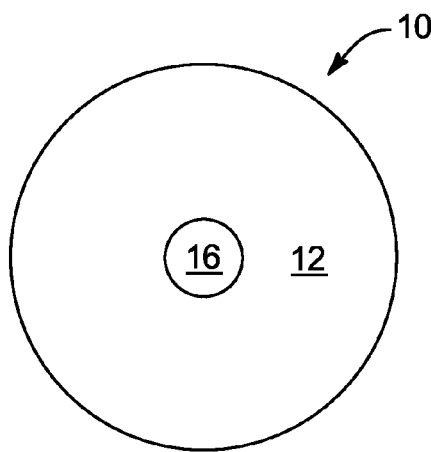
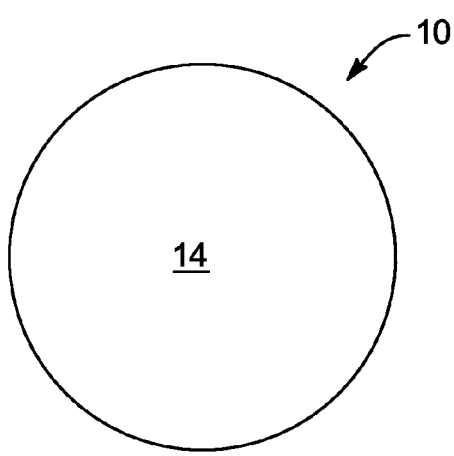
FIG. 11        FIG. 12
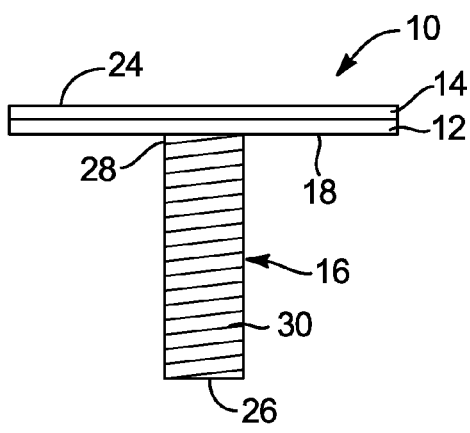
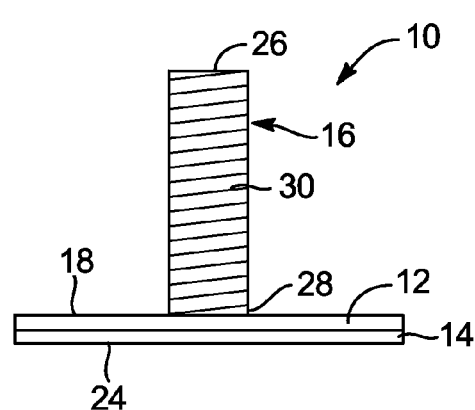
FIG. 13        FIG. 14
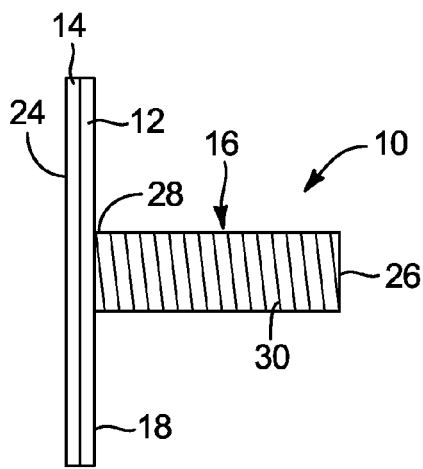
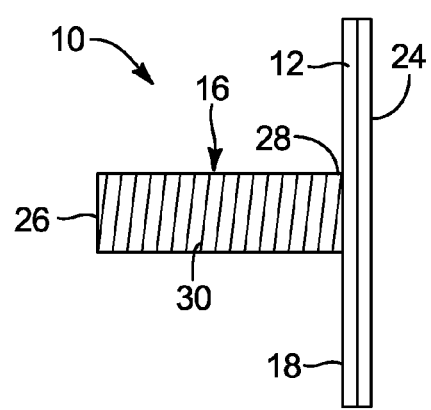
FIG. 15        FIG. 16

NON-PENETRATING ANCHOR SYSTEM AND METHOD

1. FIELD OF THE INVENTION

This invention relates to lightning protection systems and, more particularly, to novel systems and methods for anchoring cables and points thereof.

2. BACKGROUND ART

Lightning arresters are central to power systems. Typical power delivery and transmission systems involve towers or power poles holding long expanses of power-carrying cables high above the surface of the earth and across large tract of land. The power delivery systems of the public utilities create a grid across the country connecting cities, power plants, substations, generators, dams, and so forth.

Surge arresters or lightning arresters are responsible for drawing the current from lightning into conductors that will conduct the energy to ground. Accordingly, they may involve wires and air terminals above the level of the power carrier cables. Meanwhile, addition surge protection may be provided to assure that no breakdown occurs in the insulators that insulate the main power carrier lines from their towers or poles that suspend them above the earth.

Buildings have a similar problem. They stand above the earth and tend to draw lightning. Thus, lightning rods date from very early days in America. Basic lightning rod systems of yesteryear involved an air terminal or "point" that was typically fastened to extend above the highest point of a building. This air terminal or point was connected to a cable that conducted electricity from the point down to ground, literally the surface of the earth.

With modern architecture and modern buildings, the problem has become more complex in that multiple air terminals or points may be attached to a building, and a building may not have a single highest location. Often, with false fronts, parapets, and other architectural features, a rather large expanse of a building architecture may be located at the "highest" location.

Lightning protection for buildings has progressed according to certain standards. Typically, cables of a suitable size will be connected, anchored at approximately every three feet along their length, and run from point to point, where a "point" indicates an air terminal or a lightning "point" as that term is used in the art. Typically, all the points on a building will be connected to one another and to a grounding cable that carries any electrical power received from the points down to the ground.

Nevertheless, interfacing hardware with a building presents a design question. For example, buildings may be constructed of wood, masonry, concrete, steel, glass, combinations and so forth. The range of materials and their material properties vary widely. Similarly, lightning protection is not the only consideration in designing a building.

Meanwhile, lightning protection may often be provided retroactively. Buildings may already exist, and lightning protection may not have been designed into them. By the same token, even when lightning protection is contemplated during the architectural phase of a building, the attachment scheme of a lightning protection system is a consideration that must be dealt with in view of the other architectural features of the building.

At present, electrical fasteners are connected by any suitable means, which usually involves fastening to a structural portion of the building. Thus, protective covers, plates, caps, sheeting, flashing, or other mechanisms for protecting the upper reaches of a building from weather may be damaged, penetrated, breached, or otherwise compromised by the fasteners of a lightning protection system. What is needed is a less invasive lightning protection system.

BRIEF SUMMARY OF THE INVENTION

In view of the foregoing, in accordance with the invention as embodied and broadly described herein, a method and apparatus are disclosed in one embodiment of the present invention as including an anchor suitable for supporting the weight of a cable, a point, or other accessories associated with a lightning arrester system. In certain embodiments, an anchor in accordance with the invention may include a base or plate from which a stud extends. In this embodiment, the base or plate and the stud together form a mounting system to which to secure a bracket or other device designed to secure a cable, point, or the like.

For example, an adhesive pad or interface pad may be secured to the flat, back side of the plate, opposite the stud on the other side. The pad may provide differential strain and stress between a portion of the building or a location of the building where the anchor is mounted, and the material of the base.

Likewise, the material of the pad may be selected to provide shock resistance, sealing, flexibility, impact resistance, adhesion, and a reconciliation of differing coefficients of thermal expansion between the material of the building and the base of the anchor secured thereto.

In some embodiments, the stud may be threaded to receive a nut or other keeper. Similarly, ratchets, binding slides, keys, pins, and other types of fasteners may be used to secure brackets to the stud in order to anchor points, cables, or both to the anchor, which in turn secures them to the building.

In certain embodiments, a building may include a parapet, wall, or other architectural feature that acts as the extremum the maximum distance away from the ground. Accordingly, this parapet or wall may have a flashing, cap, protection, seal, coating, or the like protecting it from the elements. Accordingly, the pad may be provided with a structural adhesive that secures the pad to the flashing, seal, cover, cap, or the like of the building. Thus, the anchor need not penetrate the protection provided against weather on the building. In certain embodiments, the stud may hold a bracket of any suitable type that will secure a point, a standoff, a bracket, a clip, or other holder suitable for holding a component of the lightning protection system.

In yet another embodiment, an integrated or universal anchor may be formed from sheet metal to have arms that extend away from the base or plate a certain distance, cantilevering with respect thereto and deflecting in a response to force. The arms may extend and be bent or otherwise formed into guides, which may terminate in retainers. In certain embodiments, the cables may be pushed against the guides, which act as springs and also push against the arms, such that the guides and arms together deflect away from the cable, thus opening a gap suitable for receiving the cable against the base. In response to the cable snapping in past the guides, the arms and guides may return to their unstressed positions, capturing the cable by a retainer connected thereto. Thus, the cable may be held permanently, in a very simple system that snaps the cable into place.

In one embodiment of a process in accordance with the invention, a user may select parameters controlling the performance of an anchor, and select properties of materials and structures. Securements may be selected, after which materials meeting the parameters, properties, and structures may be selected. Stock may be cut and anchors may be assembled, fabricated or otherwise manufactured.

Providing an instruction for installation procedures and operating procedures with a packaging for the anchors, a manufacturer may distribute the anchors to installers. Installers may then analyze specifications for their installation, select sizes, materials, and processes suitable and apply the anchors to a building. Thereafter, the cables and points may be installed with other ancillary equipment, secured by the anchors.

For example, in one embodiment one may size the anchors in order to minimize the leverage, moment, or couple (engineering terms, used here as known in the engineering art) to support the weight of cables. The cables need to be supported not only against their own dead weight, but also against the weight of pulling or tensioning to which installers will subject the cables in order to minimize the sag in the cables.

Selecting a pad material may be done at the time of manufacture of an anchor, or may be done at a different time. Typically, pads will be sized, cut, and applied to anchors in a manufacturing situation. The pads will then be applied to a building as part of the anchor. An installer may remove a protective coating, such as a polymer film attached to an adhesive layer of the pad or on the pad in order to expose the pad for use. An installer may select a location on a building, and may need to clean that location.

For example, dust, debris, oxidized base material, and the like may interfere with adhesion. Therefore, a location on a building may be cleaned by solvents, scrubbing, wiping, or the like. Removing any protective layer will expose the pad such that the anchor can then be applied.

Applying a cure condition may be required for one of several reasons. For example, polymers may need time, heat, ultraviolet light, or other chemical effects in order to cure. In certain embodiments, where materials are adhesives that do not rely on the chemistry of their base material or of the location to which attached, materials may simply need time in order to fully flow, creep, or otherwise secure to an anchoring location. By whatever means required, application of a cure condition may be followed by positioning cables, including tensioning them in order to reduce sag. Thereafter, the cables may be bound to the anchors by brackets, whether integrated, bolted on, or the like.

Such a system provides many benefits. The load is distributed over a much larger area by anchors in accordance with the invention. The actual cross sectional area of material from the cover or wall protection to which an anchor may be secured is substantially larger than that of a threaded-in fastener, which penetrates and engages a small fraction of a square inch of area of building material. Moreover, there is no penetrating whatsoever of the seal, cap, flashing, or other protection materials and structures of the building. Thus, capillary action is absent to damage the building covered by the protection of the cap, seal, or the like.

Moreover, there is no caulking step to put a washer, caulk, putty, or the like around the area where a penetration has been put through a protective layer, into a wall, or both. Rather, the pad may form a seal to survive many freeze and thaw cycles. It may be selected of a material that will not harden with time, temperature extremes, or the like.

Likewise, there will be no need to set up a system of anchors limited to proceeding along horizontal surfaces at the top of a building. There need be no waiting for a period of days before they will sufficiently cure to hold. If some systems are used on vertical surfaces, they must be maintained above a minimum temperature, typically around fifty degrees Fahrenheit, and maintained for several days, typically two to three, before they are sufficiently cured to hold. Even then, they may have wide spread failures.

In accordance with the invention, non-penetrating, comparatively rapidly mounted, supports may be installed as anchors on vertical surfaces.

BRIEF DESCRIPTION OF THE DRAWINGS

FIG. 11 a front elevation view thereof;

FIG. 12 is a rear elevation view thereof;

FIG. 13 is a top plan view thereof;

FIG. 14 is a bottom plan view thereof;

FIG. 15 is a left side elevation view thereof;

FIG. 16 is a right side elevation view thereof;

DETAILED DESCRIPTION OF THE PREFERRED EMBODIMENTS

Figure 1:
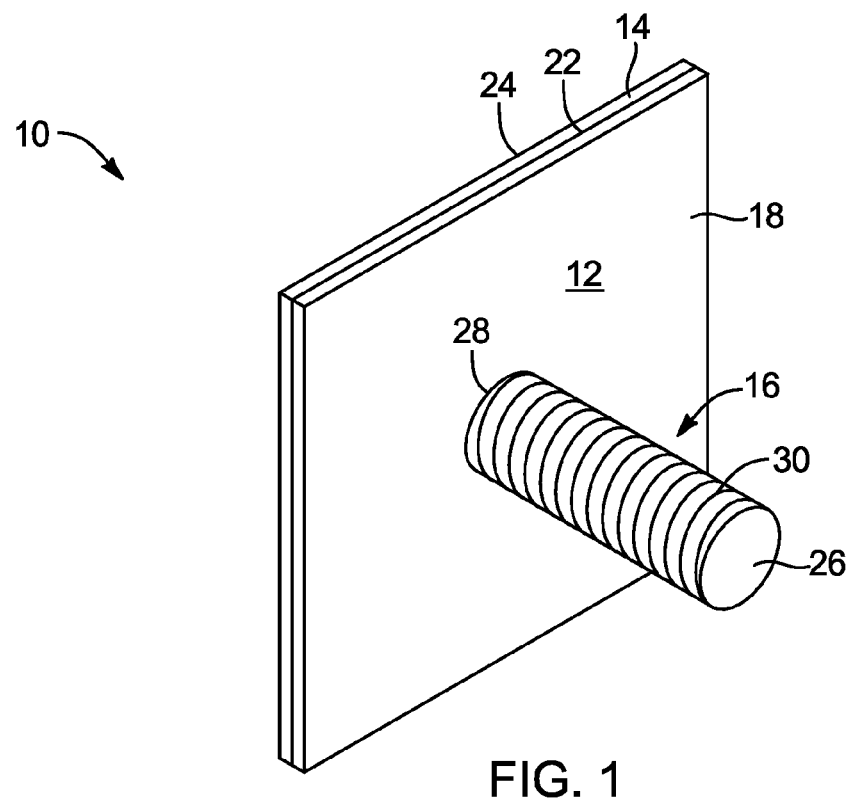
FIG. 1 is a perspective view of one embodiment of a non-penetrating anchor for a lightning arrester cable support in accordance with events.

Referring to FIG. 1, and generally to FIGS. 1-21, an anchor 10 may be formed to have a base plate 12. The base plate 12 will typically be secured to a building in order to support lightning protection cabling interconnecting several points or rods extending upward to cause a high voltage stress field around the distal end or tip thereof.

Accordingly, such points are typically formed of rod of a suitable diameter, and having a length of from about 8 to about 24 inches. Accordingly, each of these points tends to cause a stress concentration field of voltage potential about the distal end thereof. This preferentially causes each of these tips of these points or rods to be the first items struck by lightning, rather than having other structural or electrical components of the building take such a risk.

Anchors 10 in accordance with the invention may be distributed around walls, parapets, cupolas, or other extremities of a building. Typically, a ridge line, a parapet around a roof region, or the like may receive the anchors 10. The anchors 10 will support various fasteners (a term of art in lightning protection technology), which may be thought of as mechanical brackets, or other securement mechanisms to hold cables, the points, and so forth.

The base plate 12 may be fabricated with a stud 16, in a manufacturing process similar to that of manufacturing a bolt, a nail, or the like. In an alternative embodiment, the studs 16 may be attached to the base 12 after individual fabrication of each 12, 16.

The base plate 12 may be provided with a pad 14 that operates as a seal, and adhesive mechanism, a thermal expansion attenuator, a strain attenuator, and so forth. That is, between the base plate 12 and a corresponding portion of a building, a differential in coefficient of thermal expansion may exist. Similarly, temperature variations may change properties.

Likewise, freezing and thawing may intervene in capillary spaces between the base plate 12 and a building. A freeze-thaw cycle will eventually separate the base plate 12 of the anchor 10 from the building. Accordingly, the pad 14 may be, for example, a closed-cell foam of a particular type suitable for the task to form a seal Likewise, the pad 14 may be provided with an adhesive material on the opposing surfaces faces in order to bond to a building and to the base plate 12.

In certain embodiments, the pad 14 has been found to serve well if fabricated of an acrylic expanded foam or expanded acrylic, commonly known as a foam Likewise, various acrylate adhesives have been found suitable for rendering the pad 14 pressure sensitive, curable or both in bonding to the base 14.

Figure 2:
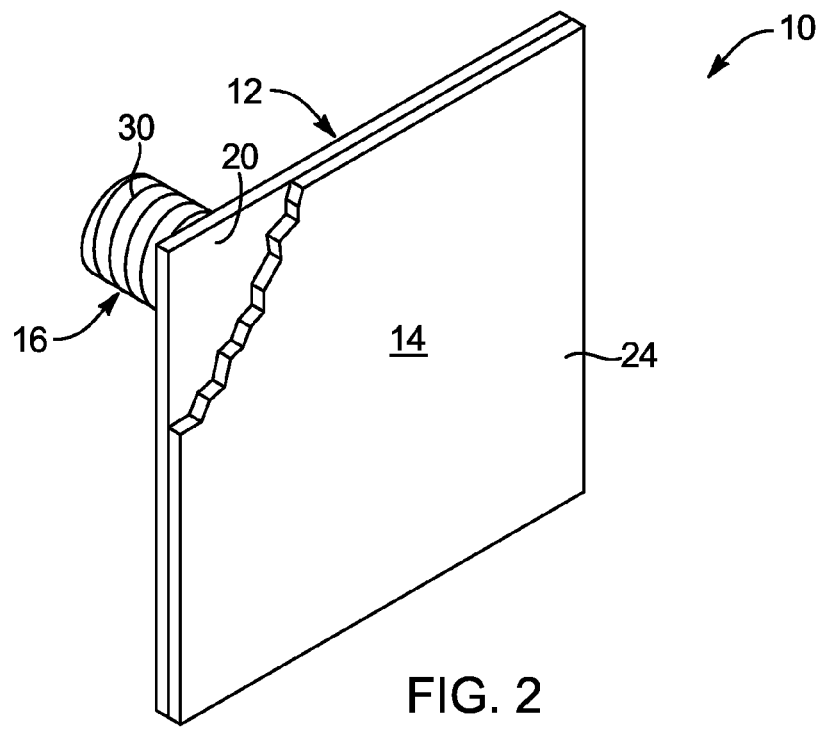
FIG. 2 is a rear perspective view of the anchor of FIG. 1.
Figure 3:
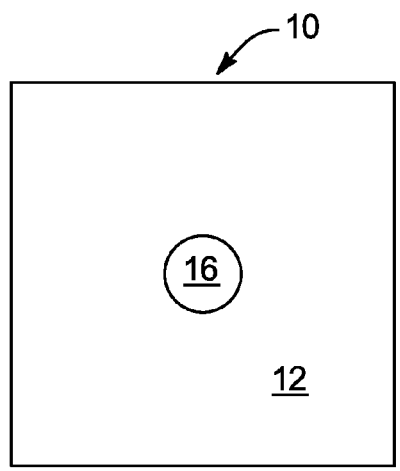
FIG. 3 is a front elevation view of the apparatus of FIG. 1.
Figure 4:
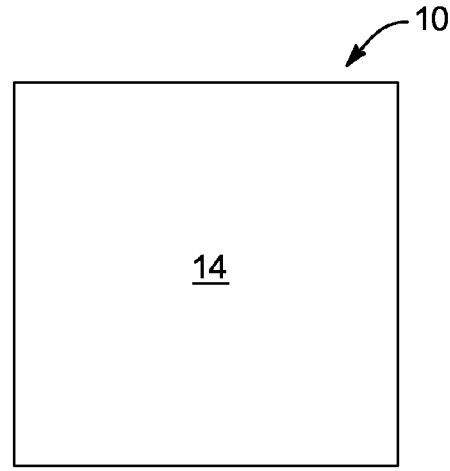
FIG. 4 is a rear elevation view thereof.
Figure 5:
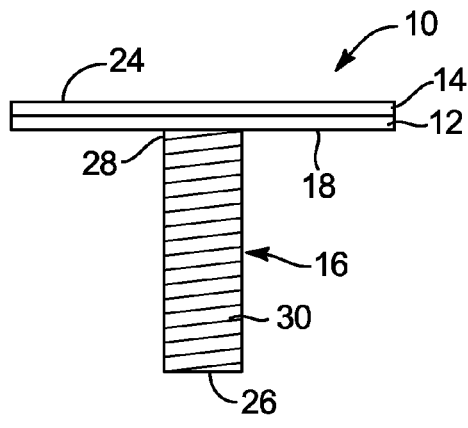
FIG. 5 is a top plan view thereof.
Figure 6:
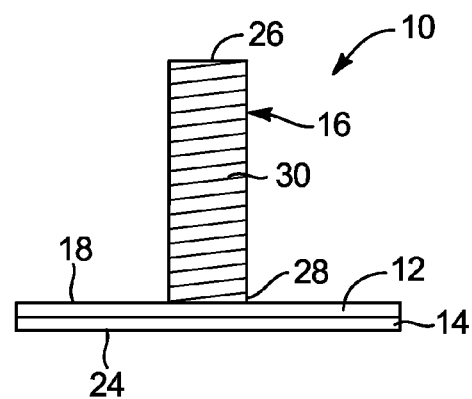
FIG. 6 is a bottom plan view thereof.
Figure 7:
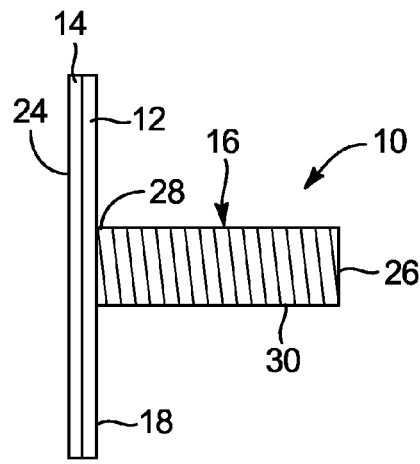
FIG. 7 is a left elevation view thereof.
Figure 8:
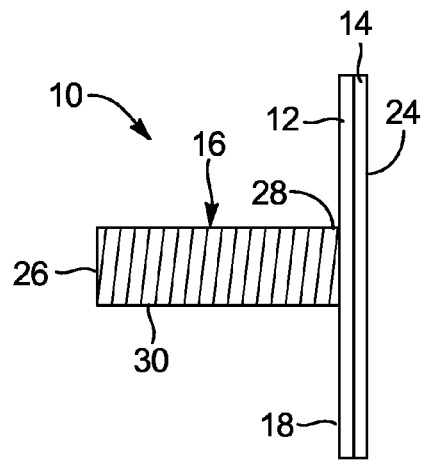
FIG. 8 is a right side elevation view thereof.

Referring to FIGS. 1-2, as well as FIGS. 3-19 (including 19A-19C) illustrate various embodiments of an anchor 10. In these embodiments, the stud 16 protrudes at a right angle or perpendicularly with respect to the front face 18 or surface 18 of the base plate 12. Meanwhile, the back face 20 or surface 20 of the plate 12 receives the pad 14. The pad 14 is mechanically adhered thereto to support the stress, strain, tension, compression, and shear that may be applied to the pad 14 by loads introduces through the studs 16 to the base 12.

Meanwhile, the face 22 or front face 22 of the pad 14 adheres by way of an adhesive applied thereon or forming the face 22 thereof. This will bond to the back face 20 of the base plate 12. Similarly, the rear face 24 or surface 24 of the pad 14 is also provided with an adhesive quality, whether applied as a separate material, or as an integral part of the pad 14. The face 24 may be covered with a protective layer, not shown, in order to protect the face 24 against debris, and maintain it completely clean and operable. Removing the layer exposes the adhesive for adhering the rear face 24 to a suitable surface in a building.

The studs 16 may include a tip 26 formed as a screw or bolt. Typically, the tip 26 will be slightly tapered, in order to pilot the studs 16 into a threaded fastener or keeper, such as a nut.

At the opposite end of the studs 16 is the root 28 and or root portion 28. The root portion 28 may or may not be threaded. That is, threads 30 near the tip 26 may receive a fastener, such as a keeper, nut, or the like. Meanwhile, if the threads 30 continue all the way to the root 28, then very thin materials may be held snugly against the front face 18 of the plate 12 by such fasteners. Nevertheless, in some embodiments, the threads 30 need not proceed all the way to the root 28 of the studs 16.

Referring to FIGS. 3-19, note that trailing letters indicate drawings or figures in a set, having some relationship. Thus, herein, the text may refer to FIG. 19, to include FIGS. 19A, 19B, 19C, and so forth. FIGS. 3-8 illustrate the orthogonal views of the apparatus of FIGS. 1 and 2. FIG. 2 illustrates a partially cut away pad 14 in order to illustrate the back surface 20 of the plate 12. In some embodiments illustrated herein, the pad 14 will be removed, and only the plate 12 and stud 16 of the anchor 10 will be illustrated. In other embodiments, or illustrations the pad 14 will be in place. In FIGS. 3-8, the various orthogonal embodiments illustrate the rectangular, or square plate 12 with its associated studs 16.

Figure 9:
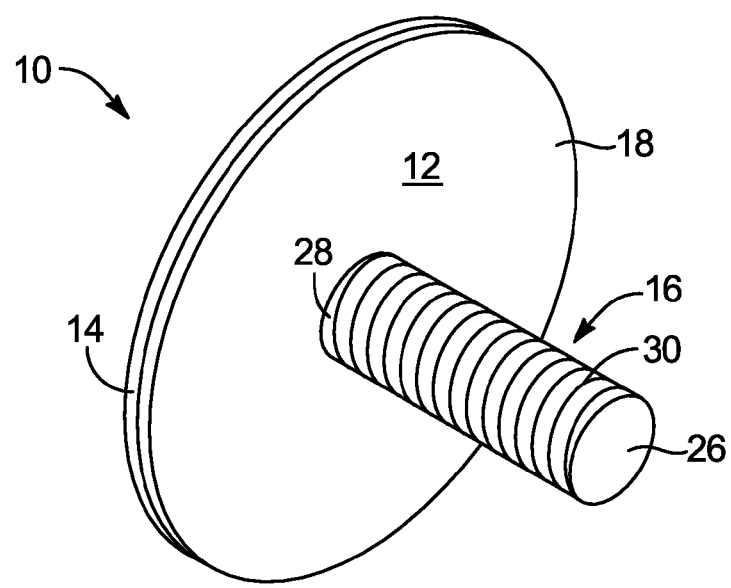
FIG. 9 is a frontal perspective view of an alternative embodiment relying on a circular base plate for the anchor of FIG. 1.
Figure 10:
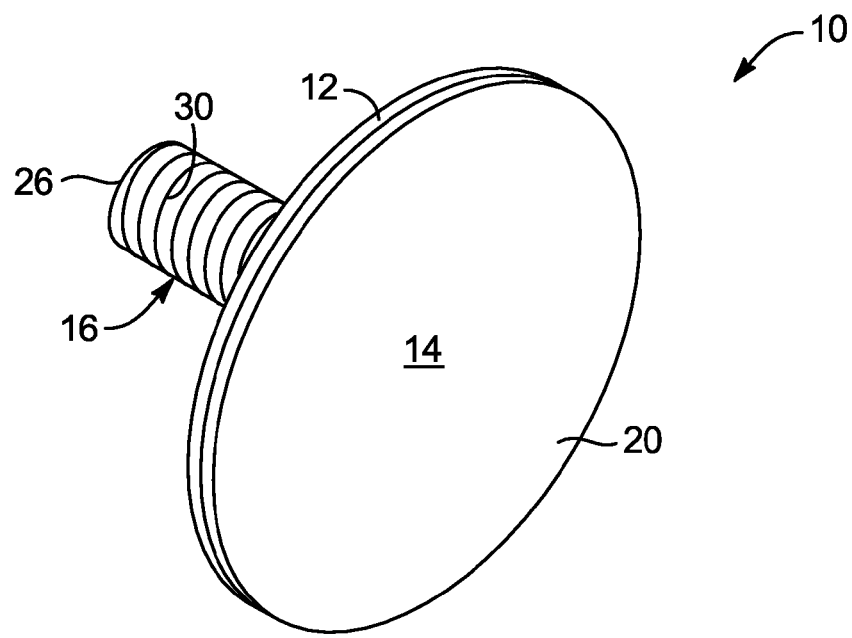
FIG. 10 is a rear perspective view thereof.

Referring to FIGS. 9-10, a perspective view from the front and rear of an alternative embodiment is shown, relying on a circular plate 12. One advantage of a circular plate 12 is that orientation of the plate 12 becomes less significant. For example, with a rectangular or otherwise cornered plate 12, orientation will be obvious to the eye of a casual observer. In contrast, a circular plate 12 is point symmetric and need not be oriented in a specific manner in order to operate and yet to appear aesthetically pleasing.

Referring to FIGS. 11-16, the various orthogonal views of the embodiment of FIGS. 9-10 look very similar to those of FIGS. 3-8.

Figure 17A:
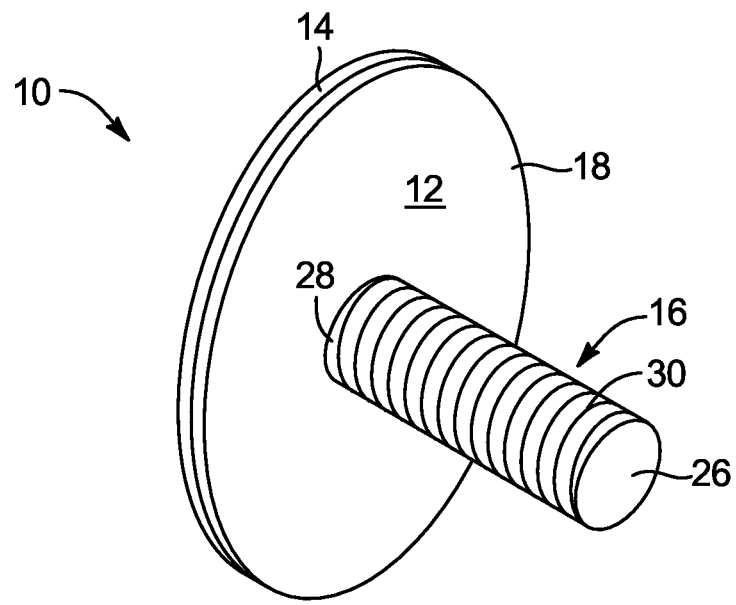
FIG. 17A is a frontal perspective view of an alternative embodiment relying on an oval shape for the base plate of the anchor of FIGS. 1 and 9.
Figure 17B:
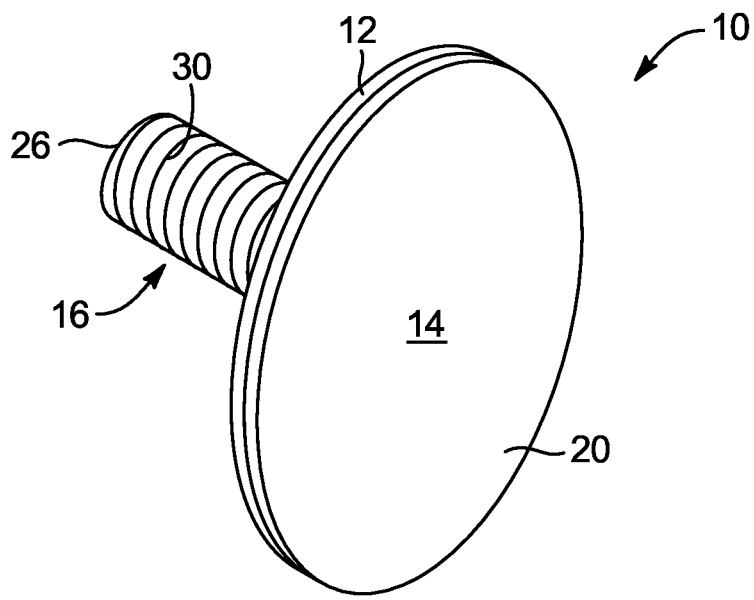
FIG. 17B is a rear perspective view of the anchor of FIG. 17A.
Figure 18A:
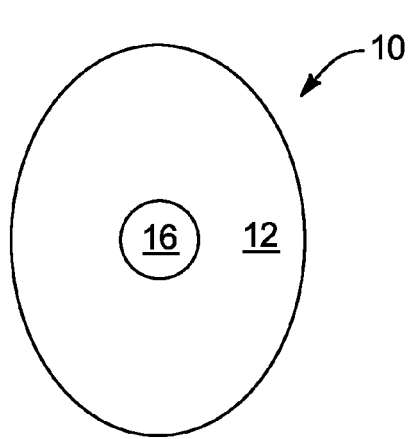
FIG. 18A is a front elevation view thereof.
Figure 18B:
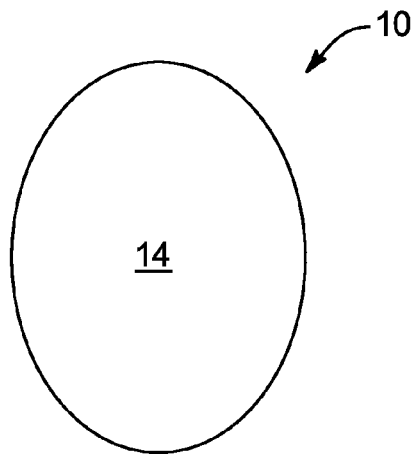
FIG. 18B is a rear elevation thereof.
Figure 18C:
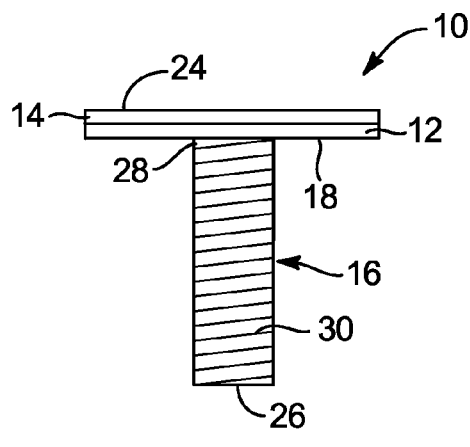
FIG. 18C is a top plan view thereof.
Figure 18D:
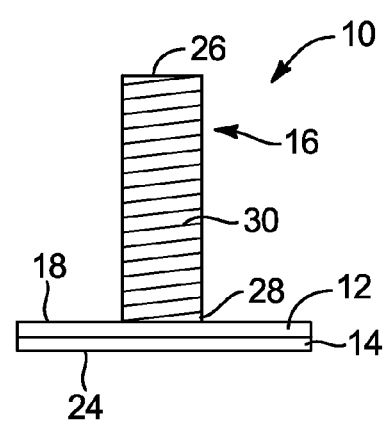
FIG. 18D is a bottom plan view thereof.
Figure 18E:
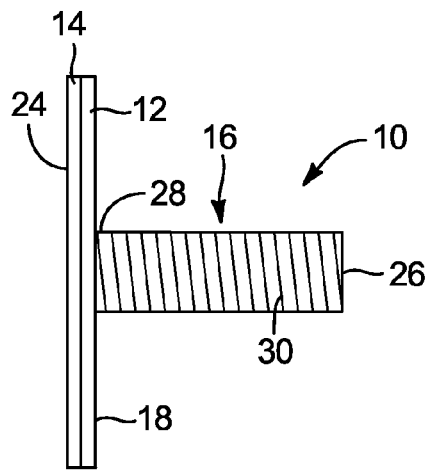
FIG. 18E is a left side elevation view thereof.
Figure 18F:
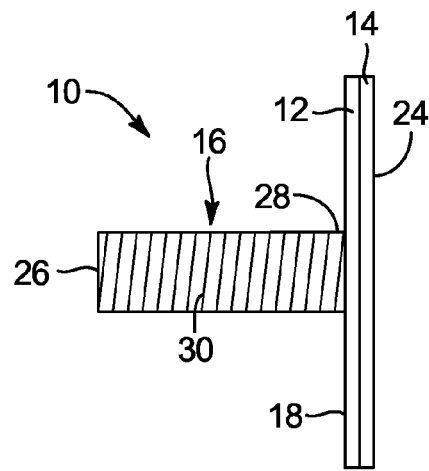
FIG. 18F is a right side elevation view thereof.

Referring to FIGS. 17A-17B, a frontal and rear perspective view of an oval embodiment of a base plate 12 needs to be oriented, but the precision required of straight lines may not be required. In this embodiment, the long axis of the elliptical or oval shape will typically be oriented vertically in order to provide more leverage advantage by the base plate 12, and particularly, a pad 14. In this way, the leverage of the studs 16 will be reduced against peeling or tipping the base plate 12 and pad 14 away from a wall to which it is attached.

Referring to FIGS. 18A-18F, the orthogonal views of the embodiment of FIGS. 17A-17B are illustrated. Again, these views appear very similar to those of FIGS. 11-16, with a major and minor axis, rather than a single diameter.

Figure 19A:
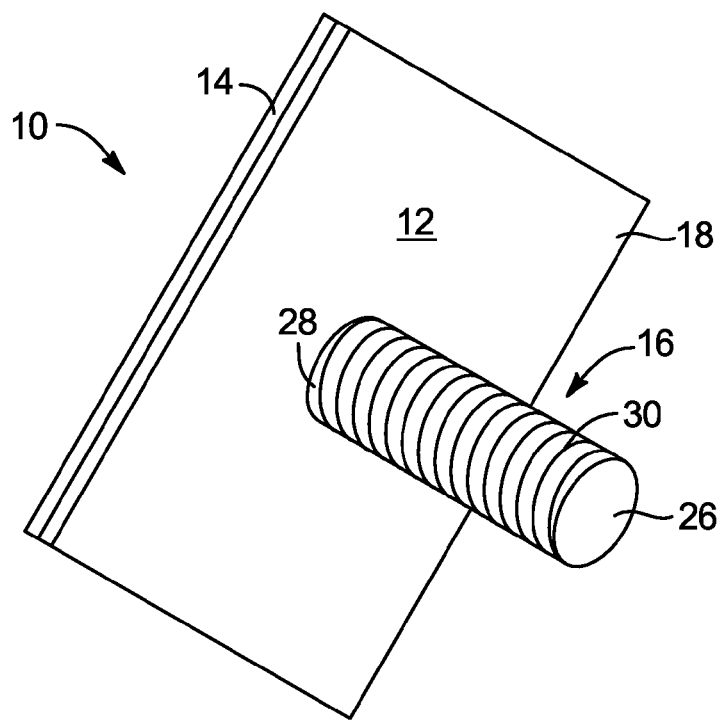
FIG. 19A is a frontal perspective view of an alternative embodiment relying on a diamond shape for the base plate of the anchor.
Figure 19B:
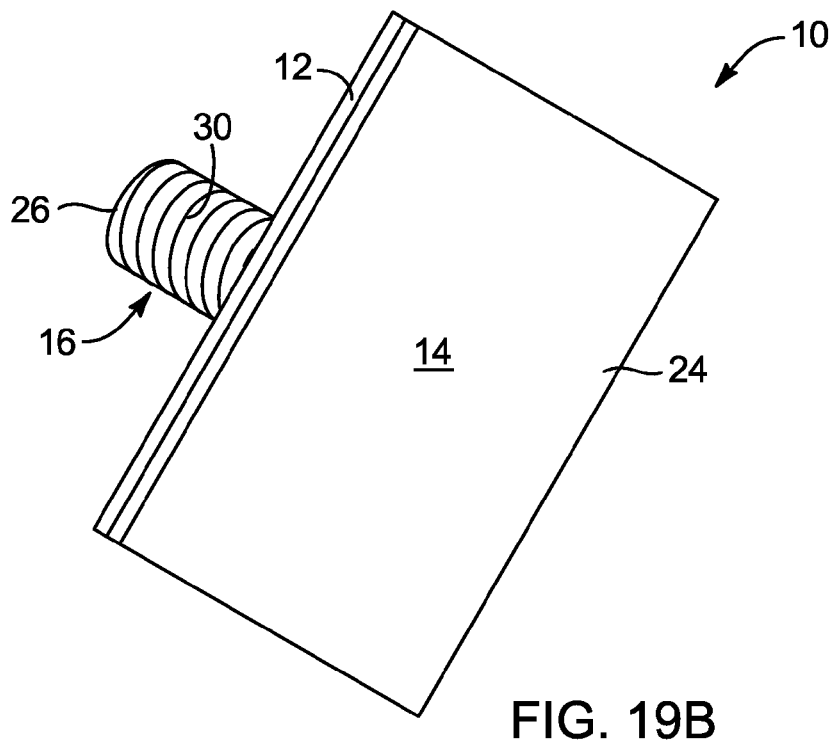
FIG. 19B is a rear perspective view thereof.

Referring to FIGS. 19A-19B, a diamond shape may be suitable for one embodiment of a plate 12 in accordance with the invention. In this embodiment, the vertical dimension is a maximum, again providing additional leverage, compared to a square embodiment. Even if the square embodiment of FIGS. 1-2 were installed in a diamond configuration, the maximum vertical dimension of the installed plate 12 would have about 40% more length. This may provide, accordingly, more leverage, and a greater supporting "moment" as that terms is used in engineering.

Figure 19C:
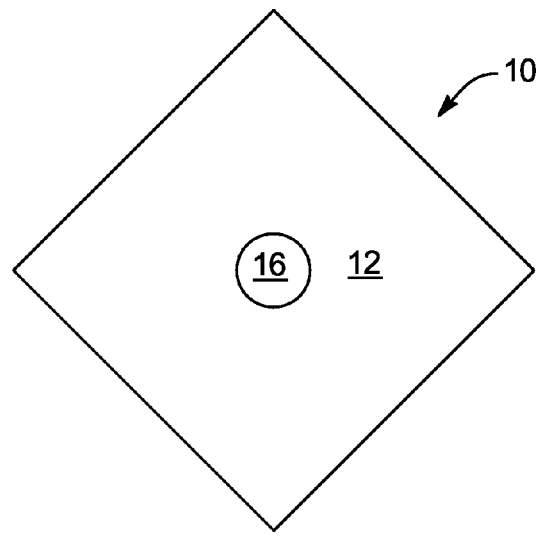
FIG. 19C is a front elevation view thereof.
Figure 19D:
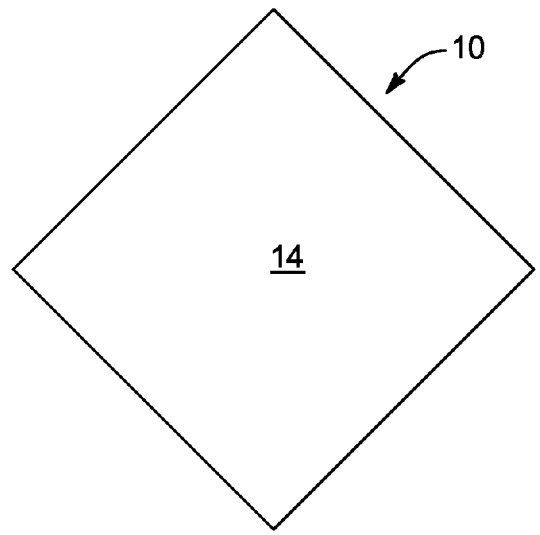
FIG. 19D is a rear elevation view thereof.
Figure 19E:
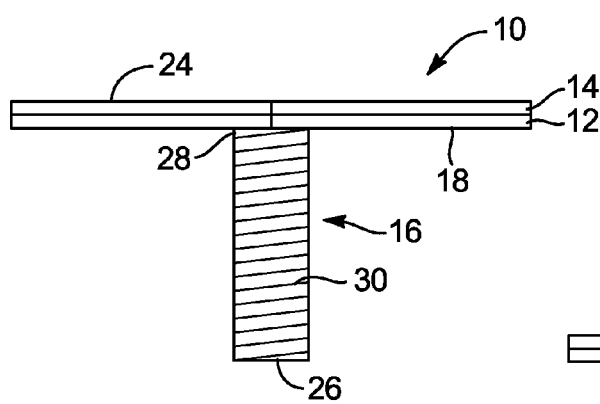
FIG. 19E is a top plan view thereof.
Figure 19F:
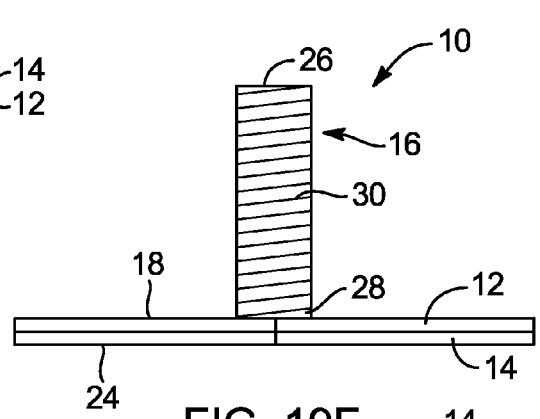
FIG. 19F is a bottom plan view thereof.
Figure 19G:
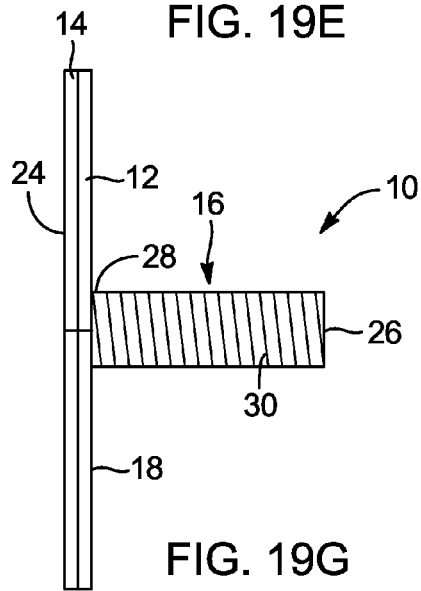
FIG. 19G is a left side elevation view thereof.
Figure 19H:
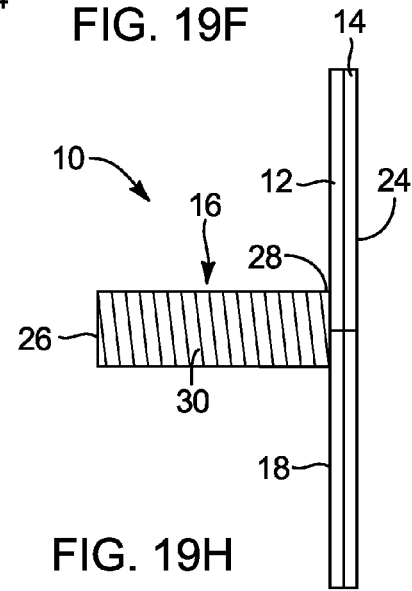
FIG. 19H is a right side elevation view thereof.

Referring to FIG. 19C, a front elevation view of the embodiment of FIGS. 19A-19B illustrates that the other orthogonal views are unnecessary in order to have a clear understanding of the shape from each direction. Again, this embodiment militates in favor of a comparatively precise orientation. This is not so much for mechanical strength, which would very little with a matter of a few degrees of rotation of the plate 12 against the surface. Rather, it is valuable for aesthetics, where any orientation away from vertical would be immediately noticeable to a casual observer.

Figure 20:
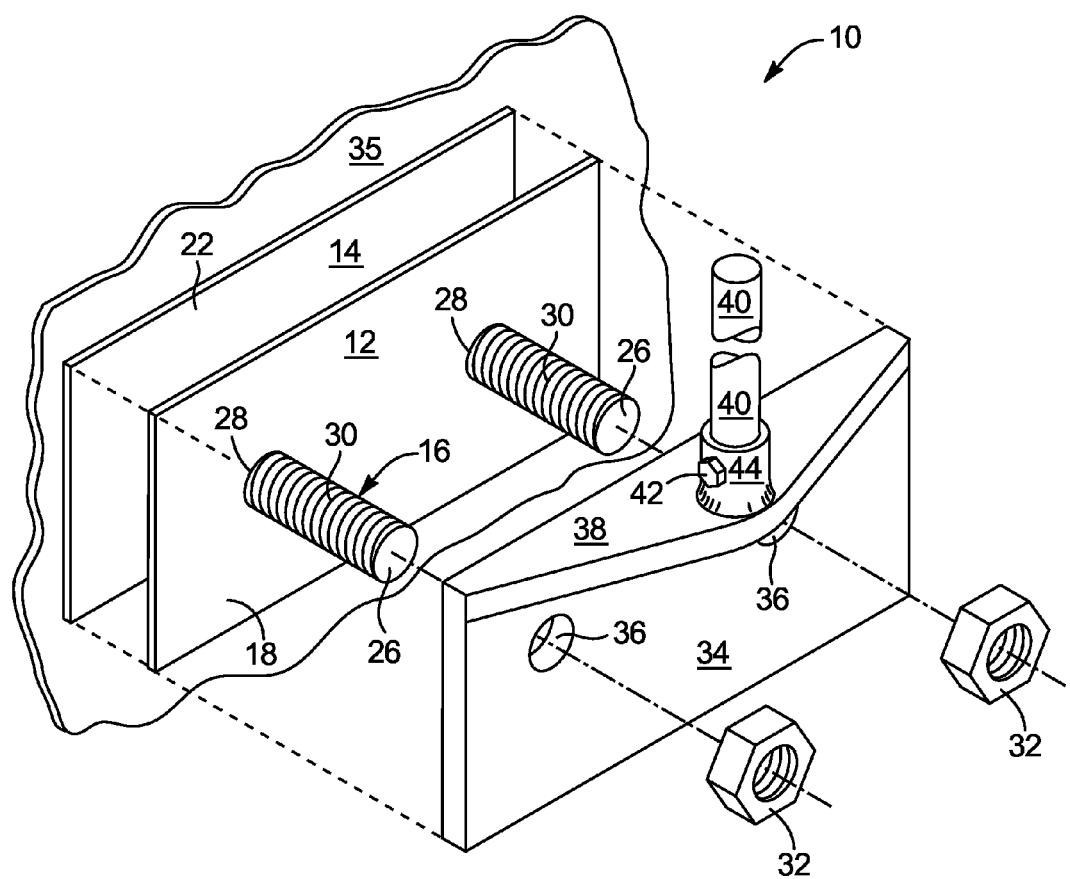
FIG. 20 is an exploded view of one embodiment of an anchor in accordance with the invention, this having two studs rather than a single stud as in FIGS. 1-19, and including an exemplary bracket with fasteners, a point, and so forth.

Referring to FIG. 20, an exploded view of one embodiment of an anchor 10 in accordance with the invention illustrates the pad 14 backing the base plate 12 to which the studs 16 are secured, fabricated, attached, or integrally manufactured. In this embodiment, a keeper 32, such as a nut 32 is used to thread onto the threads 30 of the stud 16. This will secure a fastener 34 to the plate 12, and thus to the mounting surface 35 of a building.

In this embodiment, the studs 16 pass through apertures 36, thus making themselves available for receiving the keeper 32 or the nut 32. As each nut 32 is threaded toward the root 28, beginning at the tip 26 of the stud 16, the fastener 34 is drawn toward the front face 18 of the base plate 12. In the illustrated embodiment, a stand off 38 extends away from the base plate 12, in order to support a point 40. The point 40 is shown in engineering style with the intermediate length continuing as the portions illustrated.

In this embodiment, the point 40 may be secured by a securement 42 such as a set screw 42 threaded into a receiver 44 that mounts the point 40 to support it in a vertical orientation. As described hereinabove, the point 40 operates to draw lightning, by increasing the voltage stress field near the distal end thereof (farthest from the building).

Figure 21:
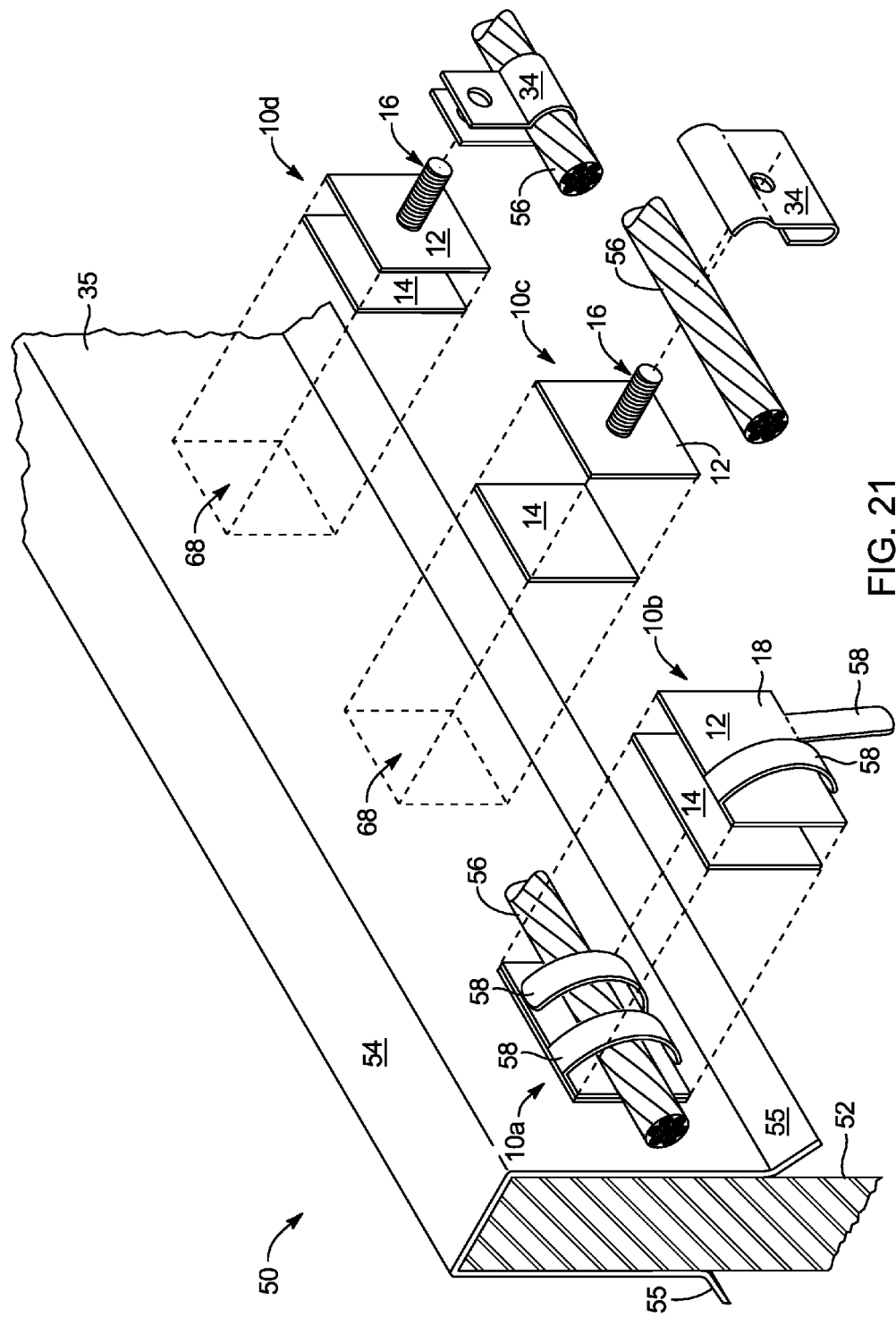
FIG. 21 is a partially cut away, exploded view and assembly view of two embodiments of brackets for anchoring cables with the anchors in accordance with the invention.

Referring to FIG. 21, while continuing to refer generally to FIGS. 1-29, an installation of an anchor 10 in accordance with the invention may include attachment of an anchor 10 by a pad 14 to a surface 35 of a building. In the illustrated embodiment, the surface 35 is part of a covered wall 52 or parapet 52. The parapet 52 or wall 52 is simply used by way of example.

In other embodiments, the surface 35 may be part of a covering on a ridge line or ridge cap from a building, a cupola, gable, eave, or other architectural feature that represents a high point in the structure of a building. Accordingly, the parapet 52 or wall 52 represents allocation that permits the point 40 to be the high point of the building by selecting a surface 35 to which the anchor 10 may be installed.

Thus, the installation 50 or assembly 50 may include, for example, an anchor 10 secured by a pad 14 against a surface 35 of a flashing 54 or cap 54 covering a portion of a wall 52.

In the illustrated embodiment, the cap 54 or flashing 54, may include a drip edge 55. The drip edge 55 is instructive. Significant effort is taken to assure protection of the wall 52 against the elements, particularly rain, and the freeze-thaw cycle of winter moisture. Accordingly, the drip edge 54 proceeds away from the wall 52, in order to assure that water striking the flashing 54 or cap 54 is conducted away therefrom. This may assure that it drips elsewhere, rather than feeding capillary spaces between the wall 52 and the flashing 54. Likewise, the drip edge 55 militates against water dripping directly from the flashing 54 onto the wall 52.

In the illustrated such as the one embodiments, illustrated in FIG. 21, a cable 56 is secured by the anchor 10 to run along the wall 52, attached to the surface 35 of the cap 54 or flashing 54. In the far left embodiment, as illustrated, the anchor 10 includes a base plate 12. Thus, the anchor 10a shows an assembled configuration of the anchor 10b also illustrated.

For example, a cable 56 is secured directly against the base plate 12 by tabs 58 that operate as extensions of the base plate 12. Tabs 58 fold over to hold the cable 56 in place. In some embodiments, such a simple, straightforward attachment mechanism may be operable without tools.

With the tabs 58 fully open, and extending as if within the plane of the base 12, an installer may press the pad 14 against the surface 35 of the flashing 54. This anchoring of the base 12 and pad 14 secures them to the surface 35 and may be used to secure them to each other. After applying pressure and waiting, or otherwise curing the securement of the pad 14 to the surface 35, an installer may then run the cable across the plate. Cable 56 may be fastened in place by bending the tabs 58 over the cable 56 and plate 12, and specifically over the front face 18 of the plate 12.

In the alternative embodiment of the anchor 10c, a location 60 may be selected, as shown in the exploded view, for receiving a pad 14 after suitable cleaning. Typically, the pad 14 here may be preinstalled on the anchor 10 at a factory, being secured to the base plate 12. Nevertheless, in some embodiments, the pad 14 may be applied in the field.

By whatever mechanism, the rear face 20 or back face 20 of the base plate 12 adheres to the pad 14, by being fastened to the front face 22 thereof. Meanwhile, the back face 24 of the pad 14, after a suitable cleaning of the surface 35 at the location 60, is adhered to the surface 35 at the location 60.

In the embodiments of the anchors 10c, and 10d, a stud 16 protruding from the base 12 receives a fastener 36, which fastener 36 actually holds the cable 56. In the illustrated embodiment, the fastener 34 is provided with an aperture 36 to receive the stud 16 therethrough. Accordingly, as illustrated in FIG. 20, a nut 32 or other keeper 32 may secure to the stud 16, thus capturing the fastener 34, and the cable 56 held by the fastener 34 to the base plate 12. Of course other embodiments of brackets may simply include loops, clamps, and the like simply supported by the stud 16 and base plate 12.

Figure 22:
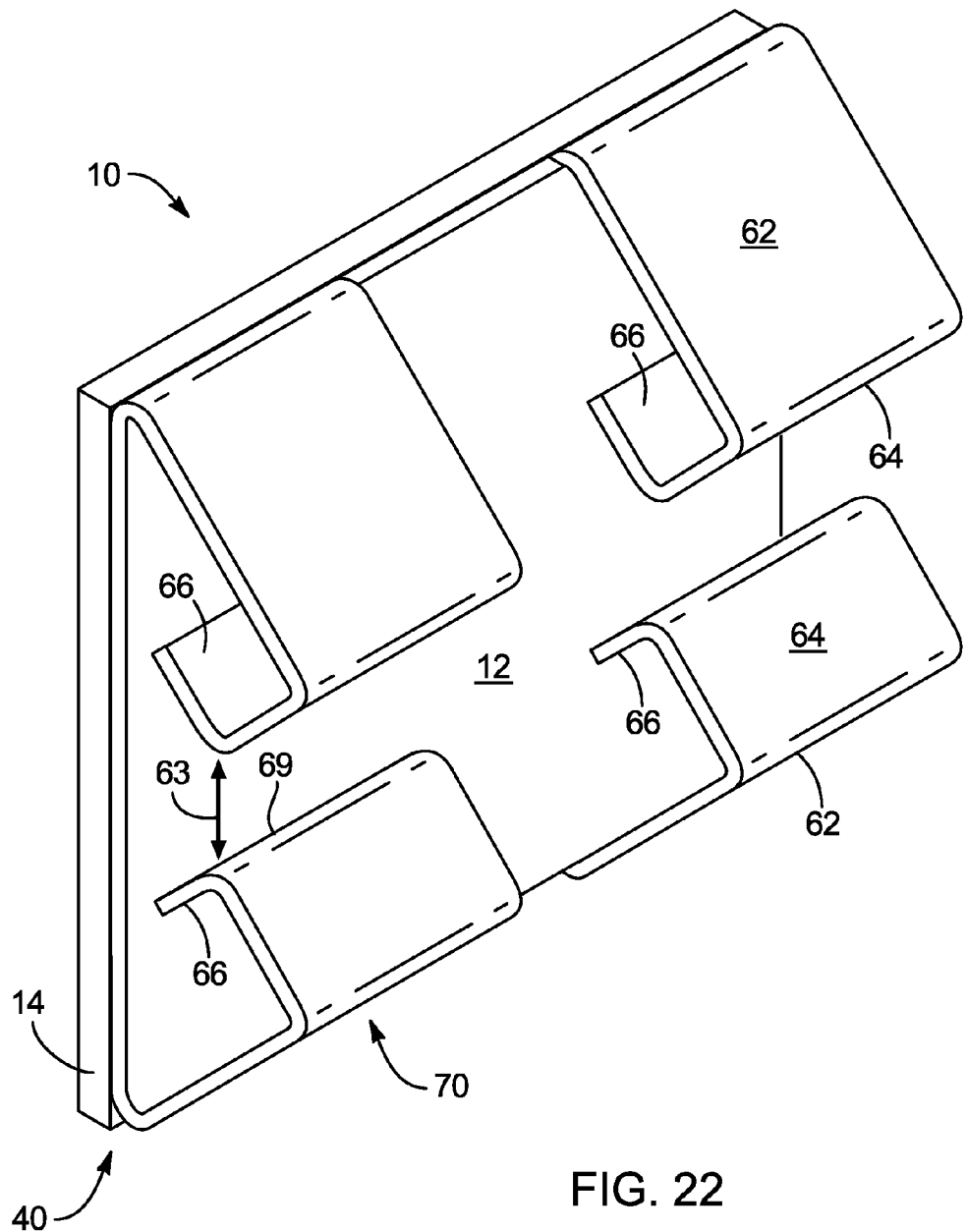
FIG. 22 is a frontal perspective view of an alternative embodiment of a universal anchor providing quick insertion and retention of cables in an anchor system in accordance with the invention.
Figure 23A:
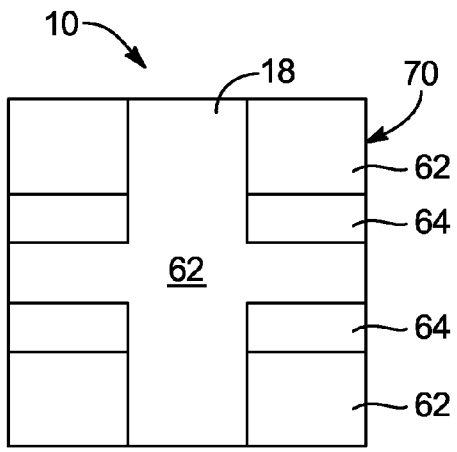
FIG. 23A is a front elevation view thereof.
Figure 23B:
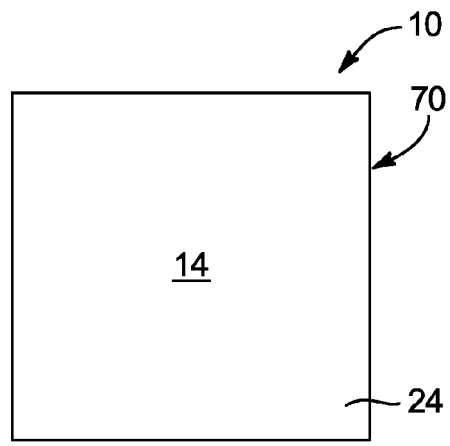
FIG. 23B is a rear elevation view thereof.
Figure 23C:
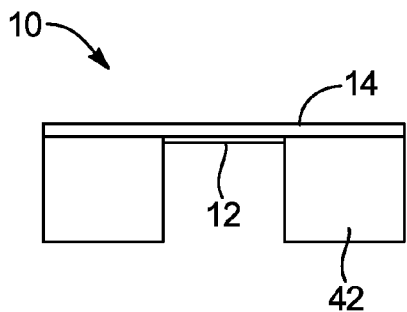
FIG. 23C is a top plan view thereof.
Figure 23D:
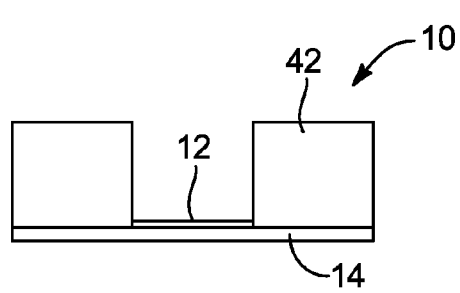
FIG. 23D is a bottom plan view thereof.
Figure 23E:
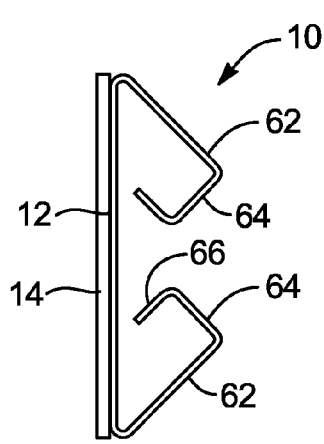
FIG. 23E is a left side elevation view thereof.
Figure 23F:
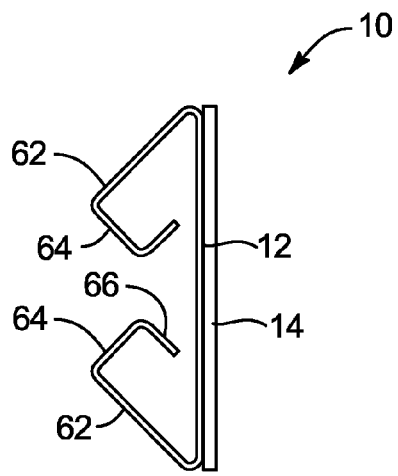
FIG. 23F is a right side elevation view thereof.

Referring to FIG. 22, which is detailed in FIGS. 22-25, a universal anchor 10 may provide a clip mechanism for quickly securing a cable 56 to a building wall 52. In the illustrated embodiment, the universal anchor 10 includes arms 62 that operate as springs, being able to deflect.

Near the center of the anchor 10, shown here in a vertical orientation, the arms 62 support a horizontal cable captured thereby. The anchor 10 may include a guide 64 or guide portion extending from the arm 62. Cable pushed between opposing guides 64, will tend to deflect the guides 64, and the arms 62 as cantilever springs. Upon opening a gap between the guides 64, a cable pressed into the guides 64 will move the guides 64 and arms 62 outboard. Moving in an outboard direction opens up a gap to receive the cable 56.

The retainers 66 will hold a cable 56 in place after the cable passes into the cable region 68. That is, after passing the guides 64, the cable no longer exerts the outboard pressure on the guides 64. The guides 64 and arms 62 may again return to their unstressed, unstrained positions, locking the cable 56 in place 68.

Typically, the vertex 69 tends to restrict the gap 63, thus requiring the guides 64 to push the arms 62 as cantilevers. The arms 62, acting as cantilever springs against the base 12, are moved away (outboard) until the vertex 69 of each guide 64 passes over a center line or center diameter of the cable 56. Thereafter, the retainers 66 tend to ride up on the cable 56, once in the cable region 68, thus drawing the cable in against the base plate 12. This occurs as the arms 62 close back over the cable 56 to their 62 original position. Thus, the retainers 66 operate to draw the cable in, against the plate 12 by force of the spring loads presented by the arms 62 and guides 64.

The anchor 10 may be referred to as a combined anchor and bracket 70 or a universal anchor 70. Thus, a particular embodiment of an anchor 10 that includes both the base 12 integrated with a mechanism for bracketing, without requiring an extra piece distinct from the base 12 as a fastener 34, may be considered a universal or integrated anchor 10.

Referring to Figures to 23A-23F, the various orthogonal views of the embodiment of FIG. 22 illustrate the details and approximate aspect ratios or relationships between dimensions. Meanwhile, these orthogonal views may be seen to present a universal anchor 70 or integrated anchor 70 that may be formed by simply cutting and bending a sheet of material. Thus, the material of the integrated bracket 70 or universal bracket 70 may typically be metal, although other materials may be suitable. For example, certain composite materials, polymeric materials, such as certain industrial plastics, and the like, may serve as the material for forming a universal bracket 70 as illustrated.

Figure 24:
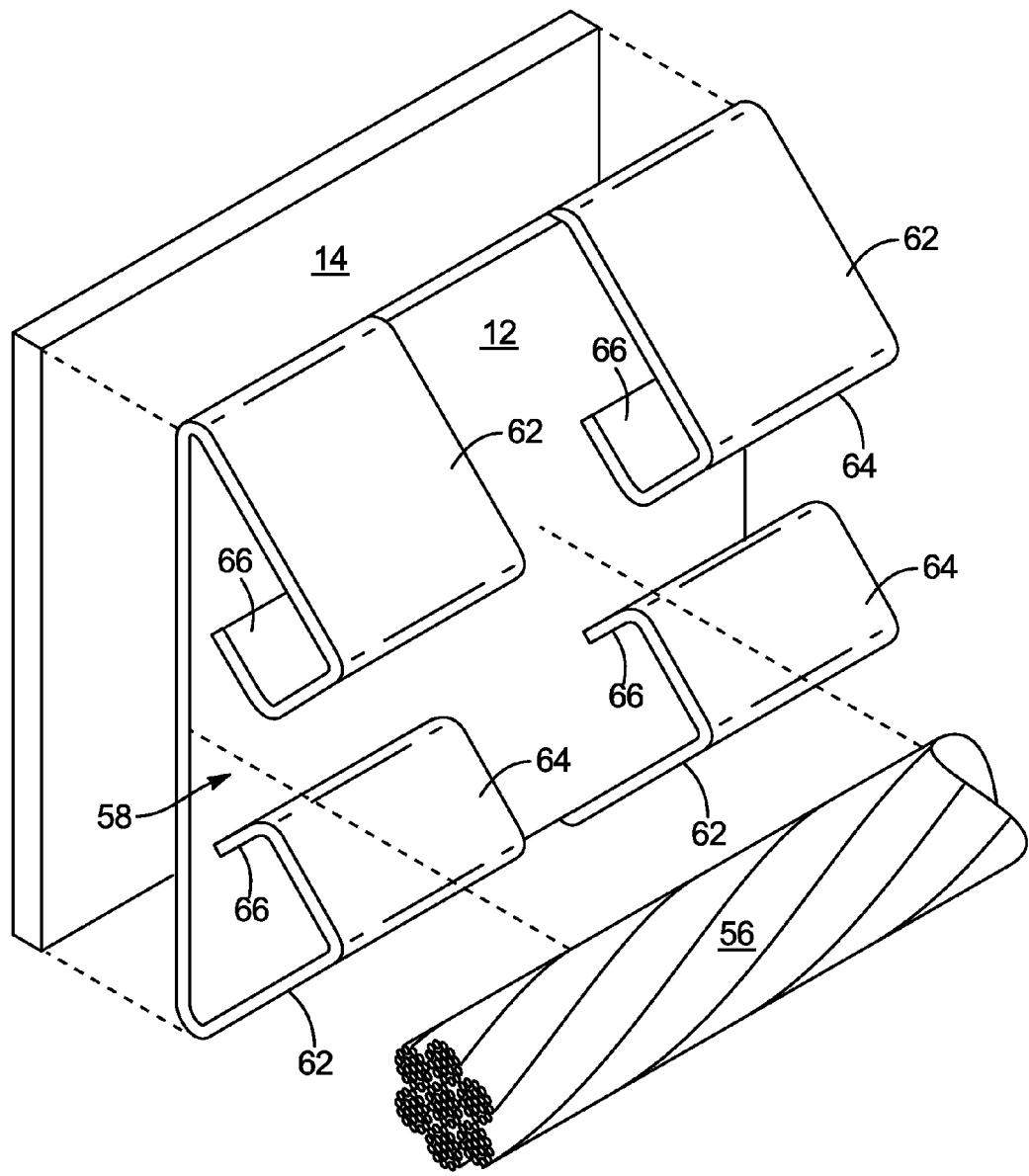
FIG. 24 is an exploded view of the anchor of FIG. 22 illustrating the presence of the securant pad behind the base plate thereof and the cable to be inserted therein.
Figure 25:
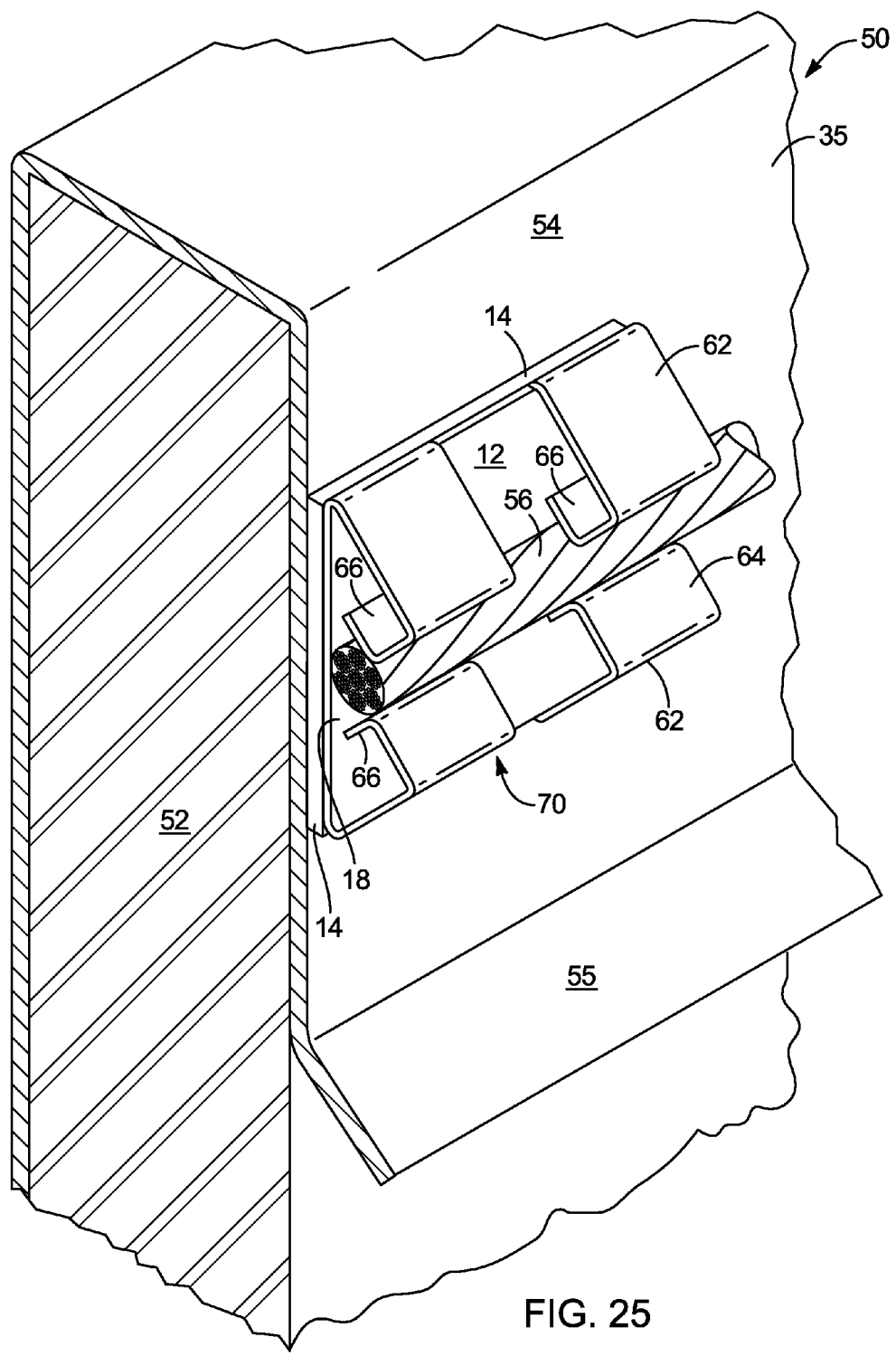
FIG. 25 is an assembled view of the anchor of FIGS. 22-24, secured to a covering or cap such as a flashing over a wall or parapet at the top of a building.

Referring to FIGS. 24-25, while continuing to refer to FIGS. 22-23, and FIGS. 1-29 generally, the integrated bracket 70 of FIG. 22 is illustrated in an exploded view with the pad 14 and cable 56 not secured. In FIG. 25, the assembly 50 includes the universal bracket 70 of FIGS. 22-24 in place, having the cable 56 installed, and the anchor 10 or universal anchor 70 installed on the surface 35 of a cover 54 of a wall 52. As mentioned hereinabove, the integrated anchor 70 or universal anchor 70 is a particular embodiment of an anchor 10.

Figure 26A:
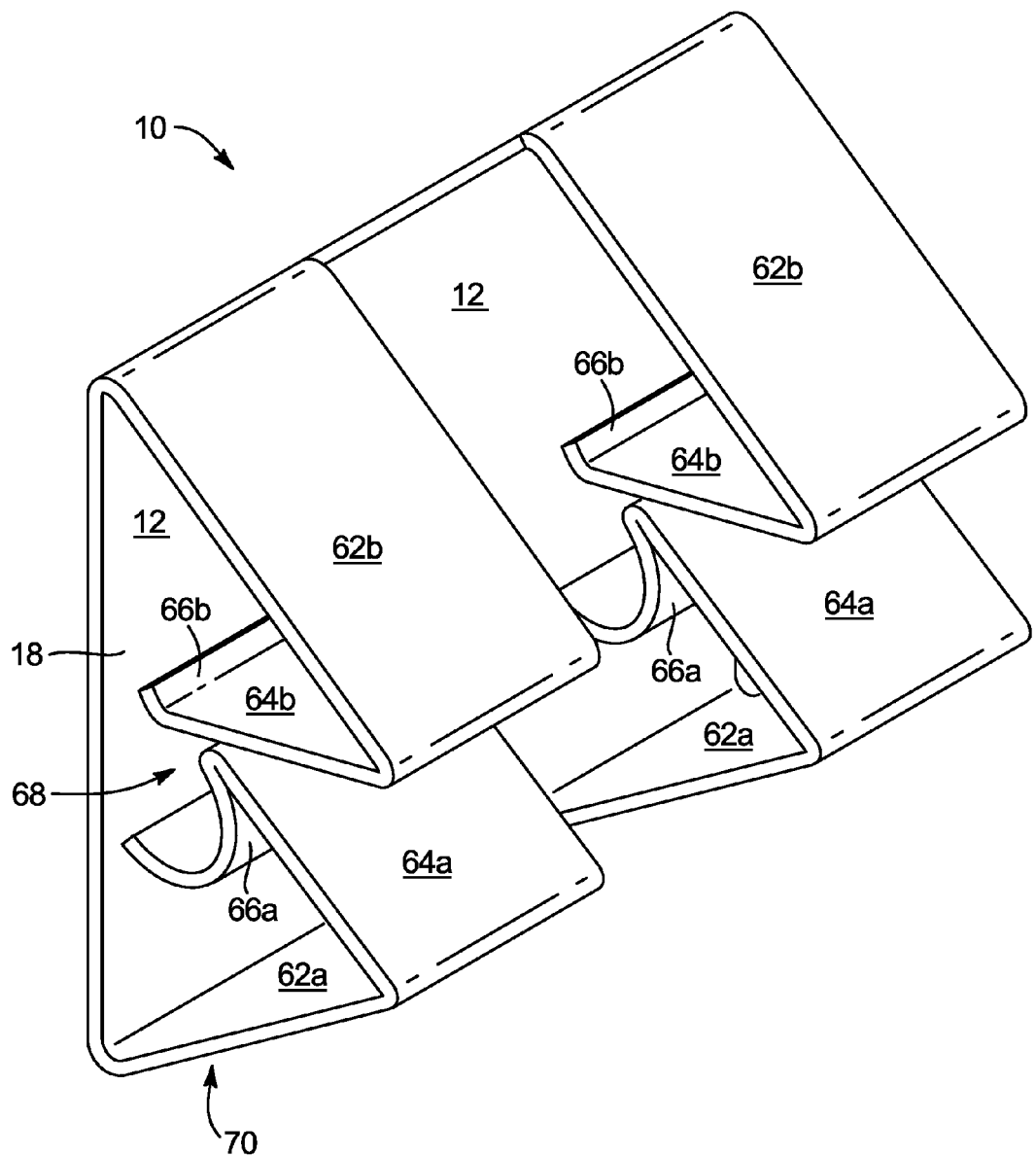
FIG. 26A is a frontal perspective view of an alternative embodiment of a universal anchor, this having an ability to completely cover the front of the secured cable.
Figure 26B:
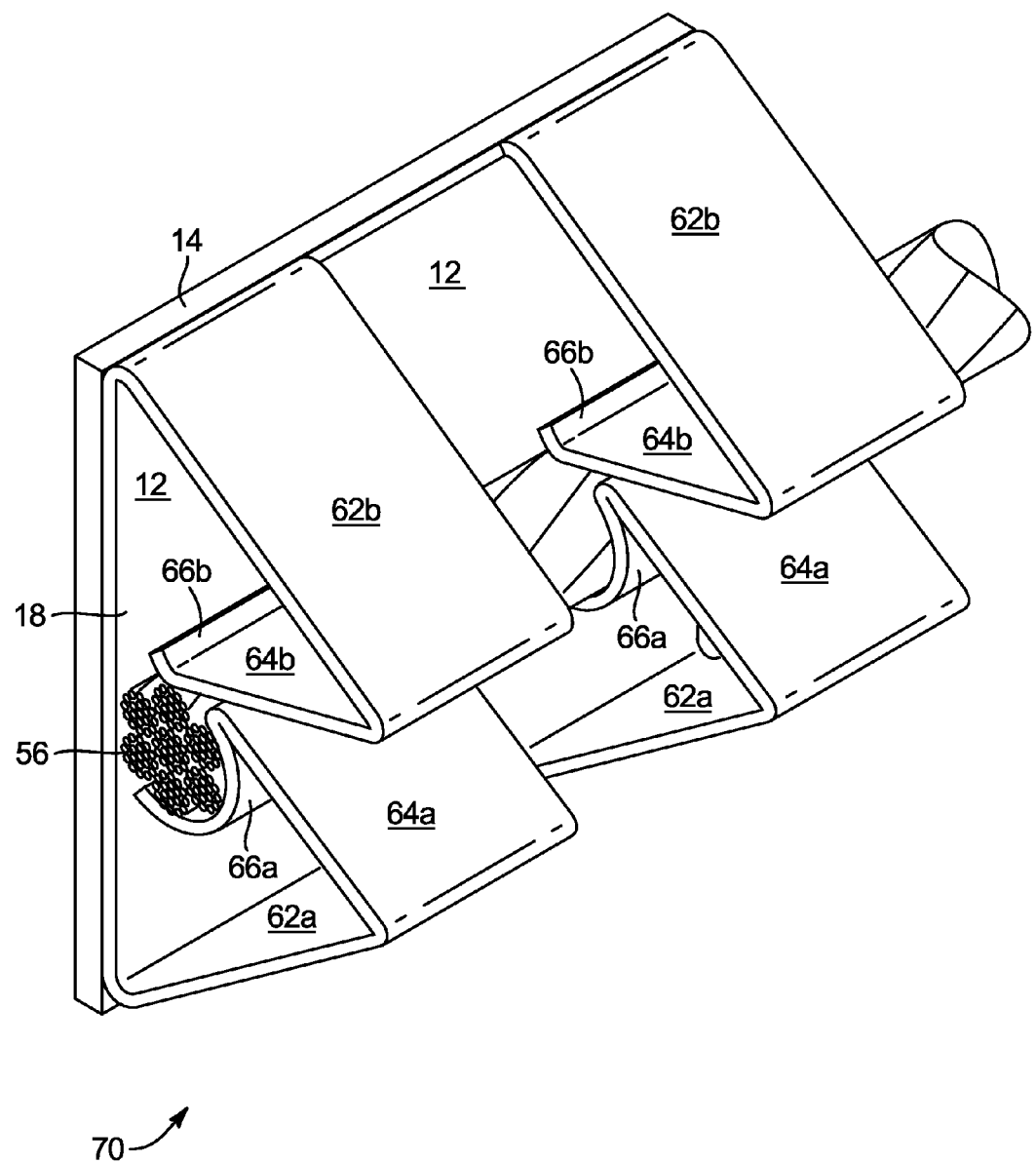
FIG. 26B is a frontal perspective of the embodiment of FIG. 26a, illustrating a cable, shown in a partially cut away view and retained therein.
Figure 27A:
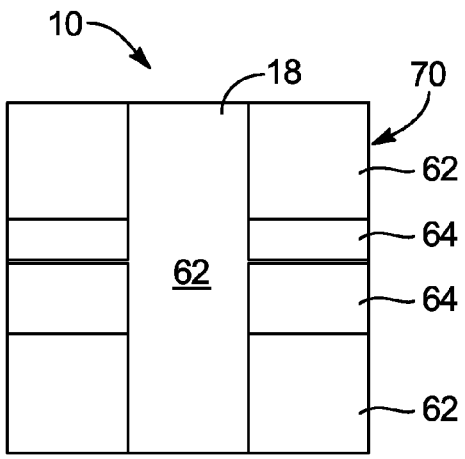
FIG. 27A is a front elevation view of the embodiment of FIGS. 26A-26B.
Figure 27B:
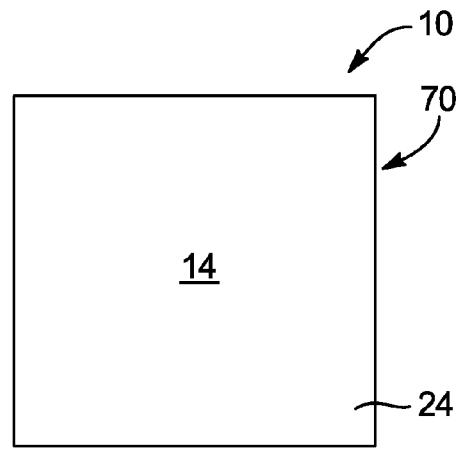
FIG. 27B is a rear elevation view thereof.
Figure 27C:
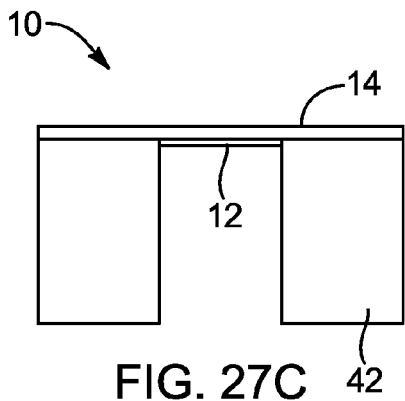
FIG. 27C is a top plan view thereof.
Figure 27D:
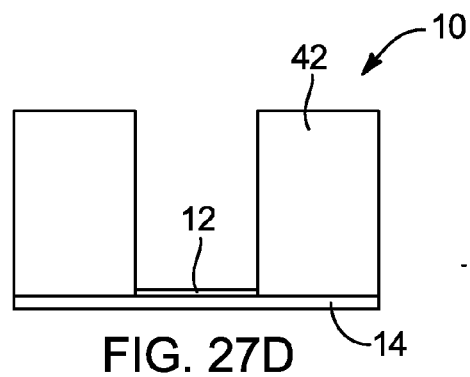
FIG. 27D is a bottom plan view thereof.
Figure 27E:
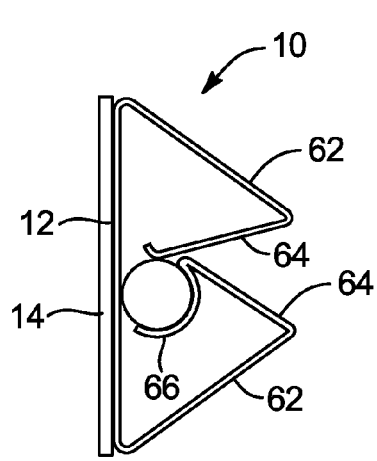
FIG. 27E is a left side elevation view thereof.
Figure 27F:
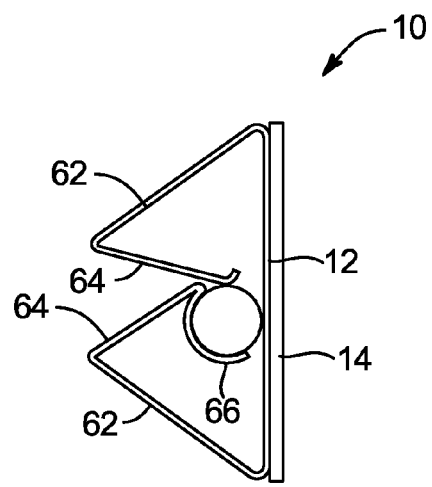
FIG. 27F is a right side elevation view thereof.

Referring to FIGS. 26A-26B, in an alternative embodiment of a universal anchor 70, a base 12 may include arms 62 and guides 64 that are not necessarily symmetrical with one another. For example, in the illustrated embodiment, the lower arms 62 may be longer, or may be the same length as the upper arms of 62. Meanwhile, the guides 64 are typically not symmetrical, and may be shaped differently to fulfill different purposes.

For example, the lower guides 64 operate as guides, tending to bend or deflect away from a cable 58 inserted between the guides 64. Bending the arms 62 away from the cable 58. The upper arms 62, and the upper guides 64$b$ operate similarly. As cantilever springs, each pull away from or draws away from the center or unloaded position according to the force applied by a cable 58 being forced between the guides 64.

However, unlike previous embodiments, the upper guide 64 terminates in a different shape than does the lower guide 64$a$. Thus, the lower guide 64$a$ is a continuation or continues on as the retainer 66$a$. Meanwhile, the lip 66$b$ is not so large, and simply provides a transition for the guide 64$b$. Herein, throughout this text, a trailing letter behind a reference numeral simply indicates a specific instance of the item identified by that reference numeral. Thus, a guide 64 is also capable of being a guide 64$a$, or guide 64$b$. Put another way, a guide 64$a$ is a specific instance of a guide 64 generally, and all may be designated as a guide 64. Similarly, a guide 64$b$ is a specific instance of a generic guide 64. In similar fashion, the retainer 66$a$ provides an actual receiver 66$a$ to hold and to completely cover a cable 58 when placed in the cable 56 when received in the cable region 68.

As illustrated, the cable 56, when forced toward the base plate 12 between the guides 64, tends to drive the guides 64 apart, acting as cantilever springs. Meanwhile, the guides 64, in turn, drive the arms 62 apart, also operating as cantilever springs with respect to the base 12. Once the gap 63 between the guides 64 has been traversed, the cable 56 may be drawn in by the retainers 66 as they close in together.

The spring force of the guide 64$b$ pushes the detent 66 toward the cable 56. Accordingly, once the cable 56, driven in between the guides 64$a$, 64$b$ has sufficient clearance, then the diameter of the cable 56 tends to drive the guide 64$a$ upward, as the detent 66$b$ and the arms 62 drive the guides 64$b$ toward the cable 56, and toward the arms 62$a$. In this way, the upper arm 62$b$ tends to drive the cable 56 into the retainer 66$a$.

In summary, an installer forces the cable 56 between the guides 64$a$, 64$b$. The guides 64$a$, 64$b$, acting as springs, deflect, also applying and transmitting force to their respective arms 62$a$, 62$b$. The combined deflection of the guides 64 and the arms 62 opens the gap 63 between the guides 64, thus receiving the cable 56. Upon the passage of the guide 64$a$ over the central diameter or maximum diameter of the cable 56, the cable 56 is seated within the retainer 66$a$. Meanwhile, the combined forces of the guide 64$b$ pushing the cable into the cable position 68 under the retainer 66$a$, is augmented by the force of the arms 62$b$ driving the guides 64$b$ and detent 66$b$ against the cable 56, until the cable 56, is well into the retainer 66$a$.

Referring to FIGS. 27A-27F, while continuing to refer to FIGS. 26A-26B, one can see that the integrated anchor 70 provides a cover 66 or a retainer 66 over the outermost surface of the cable 56. Notwithstanding the embodiment of FIGS. 22-25, which can easily retain the cable 56, the embodiment of FIGS. 26A-27F provides a positive element 66 covering the outside of the cable 56.

Figure 28:
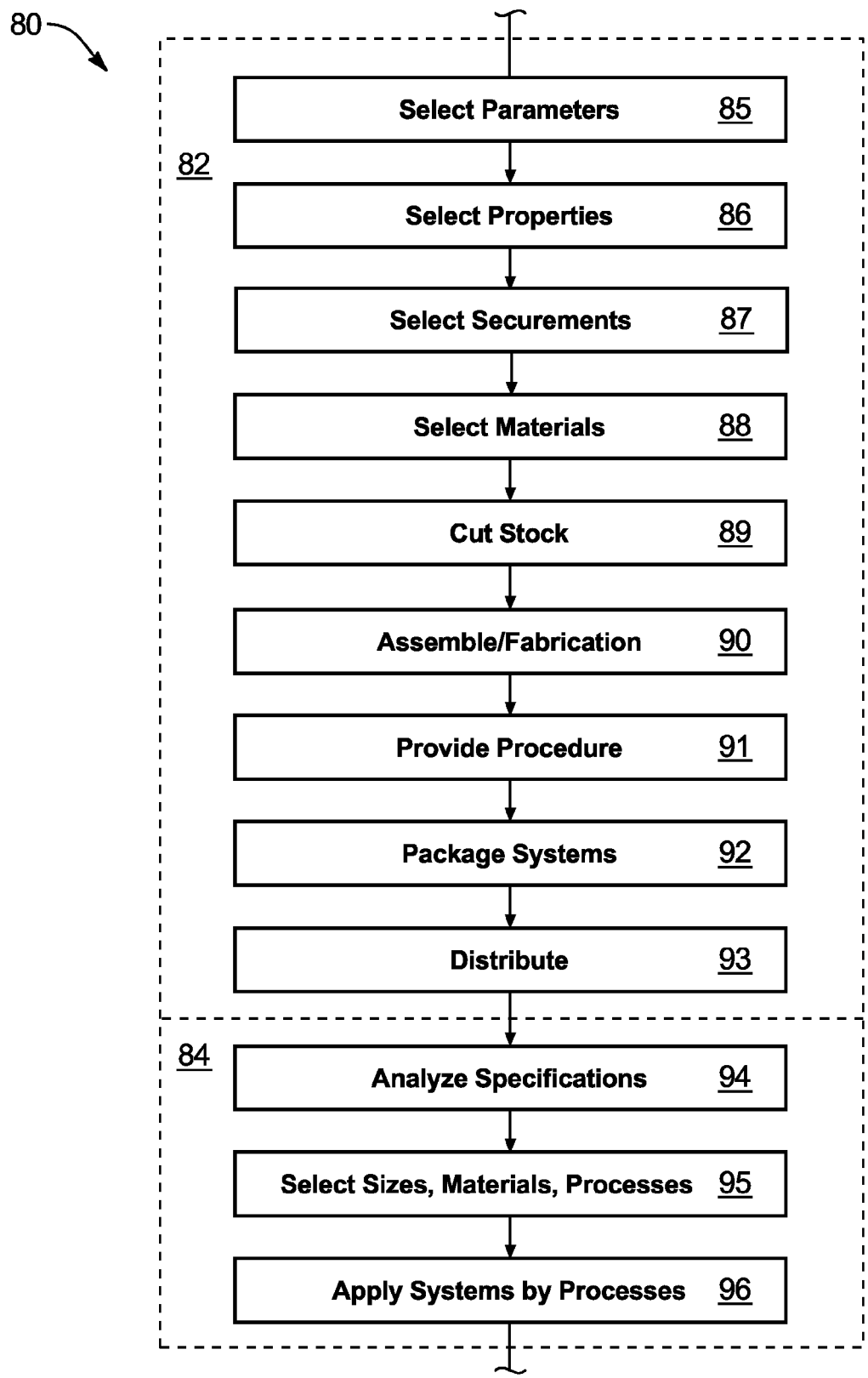
FIG. 28 is a schematic block diagram of one embodiment of a method for manufacturing and installing anchors in accordance with the invention, such as the anchors of FIGS. 1-27.

Referring to FIG. 28, a process 80 of using an anchor 10 in accordance with the invention may include both a manufacturing process 82 and an installation process 84. For example, in certain embodiments, the anchor 10 may actually be assembled onsite. In other embodiments, the anchor may be completely manufactured, assembled, and simply applied to a wall.

As discussed hereinabove, in certain embodiments brackets 34 may be selected according to a specific need. They may be used to support a cable, a point, or a specialty item in a lightning-protection circuit. In certain embodiments of an anchor 10 in accordance with the invention, brackets 34 may be conventional. They may be mounted to support cables, points, or the like on a structure of a building by an anchor 10 in accordance with the invention. In other embodiments, an integrated anchor 70 may actually include all bracketing and anchoring in a single piece, even a monolithic piece 70 of a simple homogeneous material.

By any mode, a method 80 for using anchors 10 in accordance with the invention may include manufacturing and providing 82, followed by a process 84 of installation.

Selecting 85 may involve selecting parameters that will govern the performance of an anchor 10 in accordance with the invention. For example, in certain embodiments, the specific material properties may be significant. Thus, selecting values corresponding to material properties may be important.

In some embodiments, determining whether a material property requires a metal, a polymer, a composite, or the like may hinge on the specific performance characteristics in terms of strength, spring constant, yield values of stress, deflection, maximum working strength, stiffness, and so forth.

Based on the parameters that are selected 85, selecting 86 the material properties may be done by specifying what values the parameters must meet. Thus, operational parameters may result in the characteristic properties, such as mass, density, maximum tensile stress, maximum strain, weight, dielectric or conduction properties, and so forth. Likewise, structural strength, coefficient of thermal expansion with temperature, resistance to corrosion, and so forth may be selected 86 as material properties that will govern construction of an anchor 10.

Selecting 87 securement systems may involve securements at opposite extremes ends of each anchor 10. For example, a securement mechanism to secure a base 12 to a wall 52 of a building may be one securement, while the securement by way of a fastener 34, keeper 32, or integrated arms 62 and guides 64 may also be considered securements. Accordingly, selecting 87 the types and numbers, as well as the operating mechanisms for various securements may determine what form of anchor 10, and what mechanical configuration may be required.

Ultimately, selecting 88 materials for each of the components included in an anchor 10, may result directly or indirectly the previous selections 85, 86, 87. Moreover, selecting 85, 86, 87, 88 may also include, and in an overall context will include, selecting the materials that will be used in the overall lightning protection system.

For example, cables may be fabricated of copper, aluminum, or other materials. Typically, the duty cycle, weight, electrical conductivity, thermal conductivity, and so forth do not require gold. Circuits exist that are fabricated using gold as the conducting material. Nevertheless, typically, aluminum tends to be lighter than copper, whereas copper tends to be a better conductor based on area, mass, and various other parameters. By the same token, aluminum is considered more economical. Thus, selecting 88 a material for a cable 56, anchors 10, brackets 34, integrated anchors 70, points 40, and so forth may significant considerations of material properties, fabrication methods, and so forth.

Cutting 89 stock into the materials and components to be used applies to both the components of the installation, as well as the anchors 10 and their associated or corresponding parts. For example, cutting the pad 14, that has been selected 88, at the dimensions specified will constitute one element. By the same token, cutting 89 anchors 10, or base plates 12, or studs 16, or otherwise fabricating them may be another consideration. Similarly, folding of metal sheets after cutting 89 to size, and possibly cutting 89 with separation lines for appropriate folding may also be included. Likewise, methods of making and using brackets 34 to support cables 56, points 40, or the like may be considered.

In one embodiment, cutting 89 integrated anchors 70 may involve stamping a blank, and cutting certain separation lines in that blank to be followed by other manufacturing processes.

Another manufacturing process 90 or step 90 may include assembly, fabrication, or both for an anchor. For example, in certain embodiments, the stud 16 may be formed as part and parcel of an anchor 10, as a monolithic, homogeneous, integral portion of the anchor. Thus, like a nail, bolt, or the like, the anchor 10 may be formed with a base 12 and stud 16 of a single material, formed, stamped, forged, or otherwise manufactured in a single step, or single process, as a suitable manufacturing method.

By the same token, bases 12 and studs 16 may be cut from flat stock and round stock and welded, pressed, threaded, or otherwise fabricated to bond together. Likewise, the entire anchor 10 may be fabricated of a polymer material in a molding process or by other suitable approach.

Other components to be assembled 90, fabricated 90, or otherwise manufactured 90 may include a nut 32 or other type of keeper 32, a fastener 34, adapted to securely holding a point 40 or cable 56, or the like.

In one fabrication 90, contemplated within the scope of the present invention, a flat material bender may fold past a yield point the middle of a blank for an integrated anchor 70. Various bends may be required in order to form all the distinct arms 62, guides 64, retainers 66, detents 67, vertices 69, and so forth with the appropriate gaps 63, angles, clearances, or the like Likewise, other manufacturing processes, such as quality control, buffing, blasting, painting, heat treating, and so forth may be important to the material properties selected 86. Some process steps may also be done with blanks, finished parts 10, or the like.

Packaging 92 the individual anchors 10 or components for the anchor system may be adapted to the ultimate use thereof. For example, in assembling 90 an anchor 10, the pad 14 may be manufactured, provided, cut 89, and assembled 90 to go into a packaging step 92 as a system ready to be installed with virtually no tools. In other embodiments, the pads 14 may each be provided as a separate article or a supply to be secured to a base 12 of an anchor 10 at the time of installation.

Accordingly, providing 91 procedures to installers may include printed instructions, downloadable files, website instructions, or the like. In fact, written procedures that will be packaged 92 with the anchors 10 may be included, while online instructions may also be provided 91 as a back up.

Finally, distributing 93 the anchors 10 through secondary distribution channels, direct to users, to installers, or the like may be done in a suitable manner. Typically, packaging 92 may include warnings, which may also be part of providing 91 procedures.

A process 84 or method 84 for installing an anchor 10 in accordance with the invention may begin with accumulating or otherwise gathering specifications for the performance of a lighting-protection system. Based on distances, sizes, topography, geology, urbanization, and so forth, one may analyze 94 the specifications for a particular project. This may lead to the consequent points 40 to be supported and cables 56 to be carried by the anchors 10.

Selecting 95 sizes, materials, and processes for assembling and installing the anchors 10 and their associated points 40 and cables 56 will appropriately follow. Sizes in certain embodiments are standardized and established by building codes. Building protection codes for arresting lightning exist in many jurisdictions, and may be determinative of selecting 95 the sizes, materials, and processes for installation. In other jurisdictions, cost, contemplated conditions, and the like may also factor into the selection 95 of materials, their sizes, and their processes for installation.

An installer may then apply the systems 96 by obtaining from distribution 93 the quantities of anchors 10, keepers 32, points 40, cables 56, other fasteners, and install them. Typically, anchors 10 will be installed near the highest extrema of a building, thereby protecting the building, it's metallic components, its structure, and so forth from the high voltages, currents, heating, and the like associated with lightning strikes.

In general, lightning protection systems will be grounded to earth. Points 40 will extend at their distal ends to increase the voltage stress or provide a stress concentration point at the distal end of a point 40. Thereby, dielectric breakdown in the surrounding air will occur first at a point 40, and particularly at the distal end of the point 40. Thus, following the initial corona effect that is typical of electrically active atmospheres, the electrical breakdown by lightning will occur at the distal end of a point 40, sending electrical current through the point 40, its anchor 10, and to the associated cables 56 carrying current to a grounding cable 56 that eventually is anchored in the earth.

Figure 29:
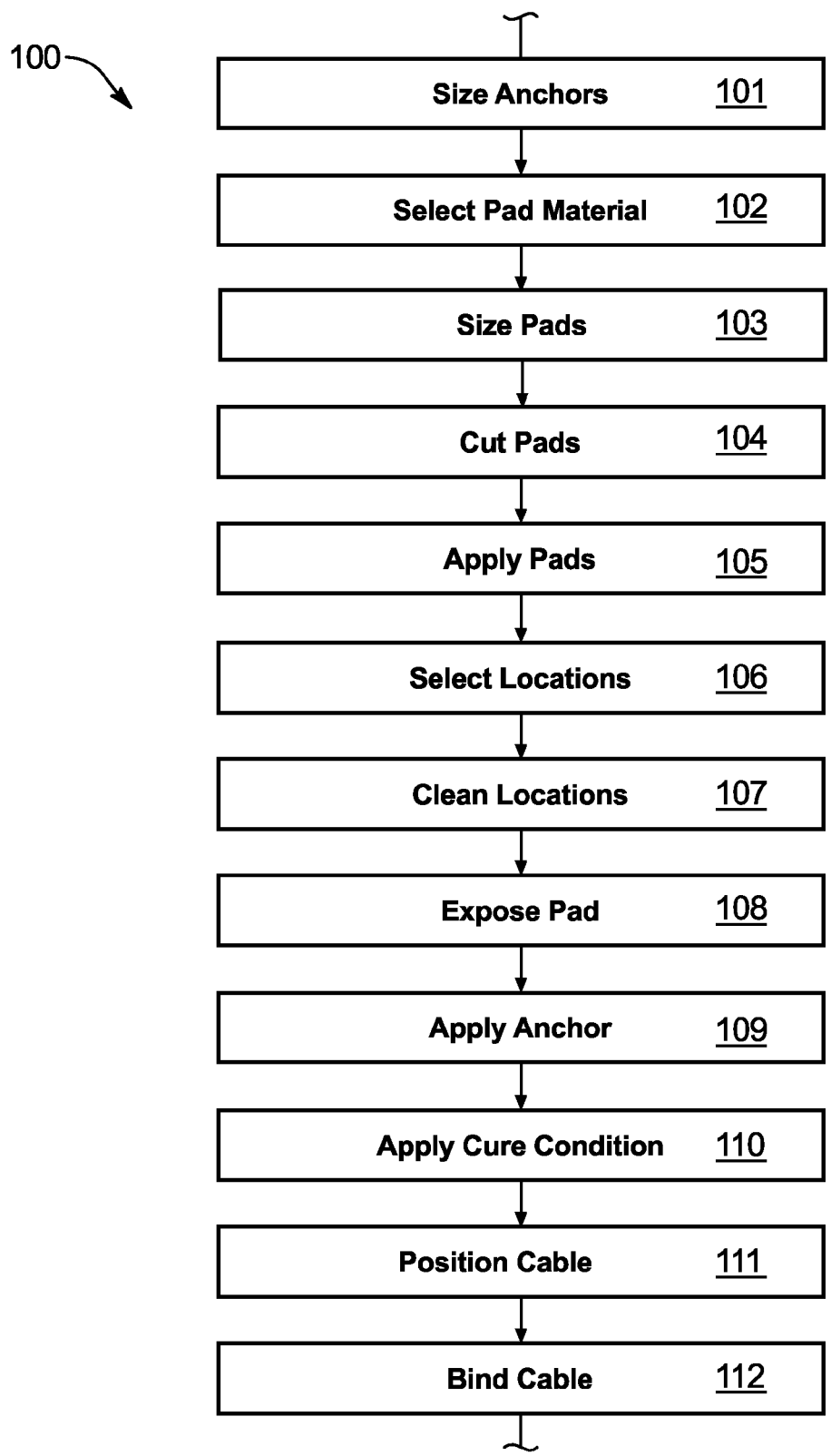
FIG. 29 is a schematic block diagram of the details of one alternative embodiment of a method for using an anchor in accordance with the invention.

Referring to FIG. 29, in one embodiment of a method in accordance with the invention, an application process 100 may involve sizing 101 anchors 10 for use in an installation. Therefore, selecting 102 a material for the pad 14 may be conducted. Sizing 103 the pads 14 may include consideration of surrounding materials, clearances, thicknesses, areas, sealing, offsets, or the like. Thickness may be governed by structural (stress, strain) requirements, installation to tolerances, and relative coefficients of thermal expansion of surfaces 35, bases 12, and pads 14. In certain embodiments, sizing 103 the pads may be dictated by the sizing of the base plate 12 to which each pad 14 will connect.

Cutting 104 the pads and applying 105 the pads 14 to a base plate 12 may be done at the time of installation, or may be done in a manufacturing process 100 at a factory shipping completed anchors 10. Likewise, applying 105 the pad may involve cutting 104 a pad to size. Nevertheless, in some embodiments, applying 105 the pads 14 to the base plates 12 may occur in a factory.

Installation may then include selecting 106 a location 60 on a building. Typically, the location 60 will be near the top of the building, and therefore on a flashing 54 or cap 54 covering a parapet 52 or a wall 52. Cleaning 107 the location 60 may involve mechanical abrasion, chemical cleaning, or simply a solvent wash. Typically, slight scrubbing with a solvent will clean off residues. In some embodiments, cleaning 107 may involve removing oxidized material having poor adhesion to the surface 35 of the base material at the location 60.

Exposing 108 the pad 14 may involve removing a polymeric film that has low adhesion forces with respect to the adhesive pad 14. Thus, exposing 108 the pad 14 by removing a film, for example, permits a user or installer to apply 109 the anchor 10 by pressing the anchor 10, and the underlying pad 14 against the location 60 on the surface 35. In this manner, the adhesive properties of the pad 14 may bond to the surface 35 as an adhesive process.

In certain embodiments, it has been found that a pressure sensitive adhesive operates well. Structural adhesives exist, and pressure sensitive adhesives exist. Accordingly, in one embodiment, the pad 14 is provided with, or as part of a pressure sensitive adhesive system having an expanded polymeric material (polymer foam) having adhesive front face 22 and rear face 24. Upon application of pressure, the adhesive may adhere, or actually cure.

That is, for example, certain acrylates require a lack of oxygen to cure. Other materials, such as epoxies and other materials may cure by heat, light, reagents, other chemicals, or the like. Accordingly, the adhesive may be applied as multi-part, single-part, heat-curable, pressure-sensitive, or otherwise. Applying 109 an anchor 10 may provide sufficient strength in the bond between the pad 14 and the surface 35 to immediately mount the remainder of the lightning-protection system.

In certain embodiments, it may be required to apply 110 a cure condition. For example, time, heat, light, chemicals, or the like may be required to cure the adhesive of the pad 14. Accordingly, applying 110 the condition required to effect a cure may require time, an additional step 110, or the like. In certain embodiments, applying 110 to cure condition may be simply a matter of waiting for passage of time with or without pressure.

Finally, positioning 111a cable 56 in the anchor 10, or in a position to be supported by the anchor may be followed by binding 112 the cable to the anchors 10 as discussed hereinabove. Typically, binding 112 the cable 56 may involve tensioning the cables by binding 112 and end of a segment of cable 56 at one clamp, and pulling a tensile load in the cable 56, in order to reduce sag, before binding 112 the cable 56 at the next or certain intermediate anchors 10.

What is claimed and desired to be secured by United States Letters Patent is:

1. A method for protecting a building against lightning, the method comprising:

selecting a building erected to extend a height characterized by a first structure having a first surface, with a contour corresponding thereto, and extending a first distance;

identifying locations on the first surface, proximate the first distance;

selecting a cable made of a first material;

selecting an anchor having a second surface shaped to conform to the contour;

the selecting an anchor wherein the anchor further comprises a third surface, opposite the second surface and configured to retain the cable proximate thereto;

selecting a pad preformed as a solid from a pad material selected to be sufficiently flexible to conform simultaneously to the contour and to the second surface adhering the pad to the anchor;

adhering the pad to a selected location of the locations; and connecting the cable to the anchor, leaving the first structure unpenetrated, integral, and provided with an electrically conductive path throughout the cable along the first surface.

2. The method of claim 1, wherein the anchor is formed of a second material, distinct from the first material to be electrically conductive with the first material, and the first material is selected to be an uninsulated, electrical conductor connected electrically to the anchor.

3. The method of claim 2, further comprising providing a bracket matingly fitted to and securable to the anchor to receive the cable.

4. The method of claim 3, wherein providing the bracket further comprises securing the bracket to the anchor to urge the cable against the third surface.

5. The method of claim 4, wherein the bracket is formed of a third material, distinct from the first and second materials.

6. The method of claim 3, further comprising holding the cable against the third surface by the bracket.

7. The method of claim 6, wherein the anchor and bracket are homogeneously formed as an integral structure.

8. The method of claim 7, wherein the anchor and bracket are formed from sheet stock.

9. The method of claim 8, wherein the anchor and bracket are formed of a metal.

10. The method of claim 1, further comprising:
providing a bracket formed integrally with the anchor to extend therefrom; and
securing the cable to the anchor with the bracket.

11. The method of claim 10, further comprising:
placing the cable against the bracket; and
moving the bracket to secure thereto the cable.

12. The method of claim 11, wherein;
the bracket has a first position and a second position; and
the method further comprises releasing a force applied to the bracket, by the cable, after the moving to return the bracket substantially to the first position.

13. The method of claim 1, further comprising:
selecting sheet stock;
cutting a blank from the sheet stock to form a base portion, arm portions, and guide portions;
folding the arm portions with respect to the base portion to form cantilevered springs; and
folding the guide portions with respect to the arm portions to form cantilevered springs.

14. The method of claim 13 further comprising:
folding retainer portions extending from the guide portions opposite the arm portions, respectively;
defining a gap by deflecting the arm portions and guide portions by urging the cable against the guide portions; and
securing the cable to the anchor by the retainer portions reducing the gap in response to the arm portions and guide portions returning from the deflecting.

15. A method for protecting a building against lightning, the method comprising:
identifying structure types corresponding to building structures, characterized by a first surface, having a contour corresponding thereto and designed to be positioned a distance above a ground level corresponding to the building structures;
identifying locations on the first surface;
identifying cable types characterized by materials conductive of electricity;
selecting an anchor comprising
a second surface shaped to conform to the contour,
a third surface, opposite the second surface at a fixed thickness, a pad formed of a solid selected to be sufficiently flexible and conformal to be compliant with and between the contour and second surface and bonded thereto and therebetween,
a bracket effective to secure a cable of the cable types proximate the third surface;
selecting a location on the first surface;
adhering the anchor to the location by adhering the pad therebetween, based upon pressure sensitive adhesive properties corresponding to the pad and engaging the first and second surfaces;
connecting a cable of the cable types to the anchor, leaving the first surface integral and un-penetrated.

16. The method of claim 15, wherein:
the anchor is formed of a material distinct from the cable and from the surface; and
the anchor comprises a bracket homogeneously formed with the anchor to receive the cable.

17. The method of claim 16, wherein:
the bracket has an equilibrium position and a flexed position;
the method further comprises opening the bracket by applying force by the cable against the bracket; and
the method further comprises securing the cable to the first surface by the bracket returning to a closed position from the opening.

18. The method of claim 15, further comprising:
selecting sheet stock;
cutting a blank from the sheet stock to form a base portion, arm portions, and guide portions;
folding the arm portions with respect to the base portion to form cantilevered springs;
folding the guide portions with respect to the arm portions to form cantilevered springs
folding retainer portions extending from the guide portions opposite the arm portions, respectively;
defining a gap by deflecting the arm portions and guide portions by urging the cable against the guide portions; and
securing the cable to the anchor by the retainer portions reducing the gap in response to the arm portions and guide portions returning from the deflecting.

* * * * *